(12) United States Patent
Dunser

(10) Patent No.: US 7,611,156 B2
(45) Date of Patent: Nov. 3, 2009

(54) SANITIZING APPARATUS FOR SHOPPING CART HANDLES AND OTHER HANDLES

(76) Inventor: Alex H. Dunser, 1001 S. MacDill Ave., Tampa, FL (US) 33629

( * ) Notice: Subject to any disclaimer, the term of this patent is extended or adjusted under 35 U.S.C. 154(b) by 364 days.

(21) Appl. No.: 11/439,143

(22) Filed: May 23, 2006

(65) Prior Publication Data

US 2006/0267299 A1 Nov. 30, 2006

Related U.S. Application Data

(63) Continuation-in-part of application No. 11/189,632, filed on Jul. 26, 2005.

(60) Provisional application No. 60/616,688, filed on Oct. 7, 2004, provisional application No. 60/684,112, filed on May 24, 2005.

(51) Int. Cl.
*B62D 39/00* (2006.01)

(52) U.S. Cl. ................................................. 280/33.992

(58) Field of Classification Search ............ 280/33.992, 280/33.993, DIG. 4
See application file for complete search history.

(56) References Cited

U.S. PATENT DOCUMENTS

| | | | | |
|---|---|---|---|---|
| 4,210,974 | A * | 7/1980 | Stoltzman | 15/21.2 |
| 4,953,999 | A * | 9/1990 | Rivers | 401/9 |
| 5,269,615 | A * | 12/1993 | Lewis, Jr. | 401/9 |
| 5,492,425 | A * | 2/1996 | Carter et al. | 401/10 |
| 5,820,142 | A * | 10/1998 | Duer | 280/33.992 |
| 6,269,512 | B1 * | 8/2001 | Thomson et al. | 15/104.92 |
| 6,645,435 | B2 * | 11/2003 | Dawson et al. | 422/110 |
| 2006/0230576 | A1 | 10/2006 | Meine | |

* cited by examiner

*Primary Examiner*—Christopher P Ellis
*Assistant Examiner*—Bridget Avery
(74) *Attorney, Agent, or Firm*—Ronadl E. Smith; Smith & Hopen, P.A.

(57) ABSTRACT

A shopping cart handle and sanitizing apparatus and method includes a housing with a sanitizing fluid reservoir mounted to slidably encircle the cart handle and dispense the fluid onto the handle from applicators in the housing that contract the handle as the housing is moved to and fro. A pump mechanism transfers fluid from the reservoir to the applicators.

13 Claims, 16 Drawing Sheets

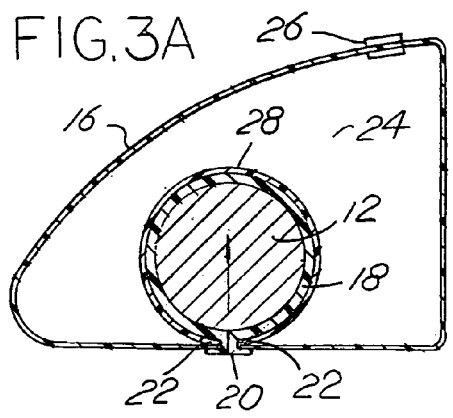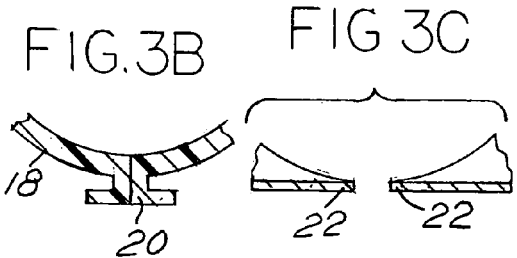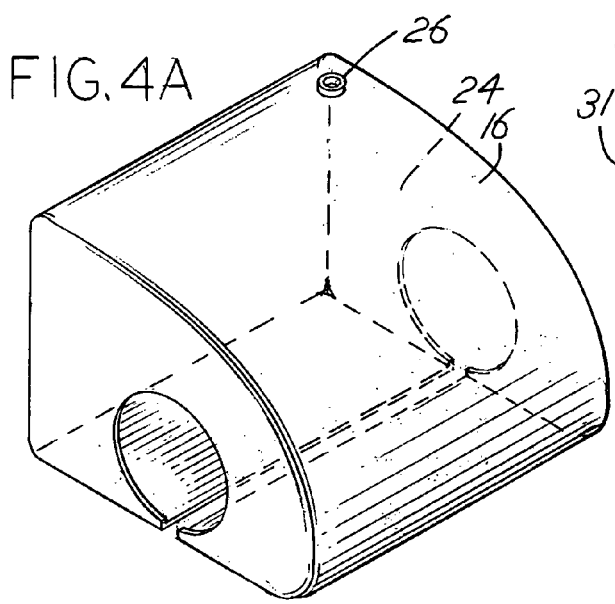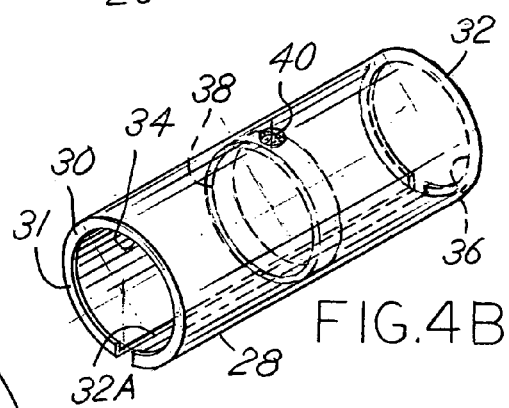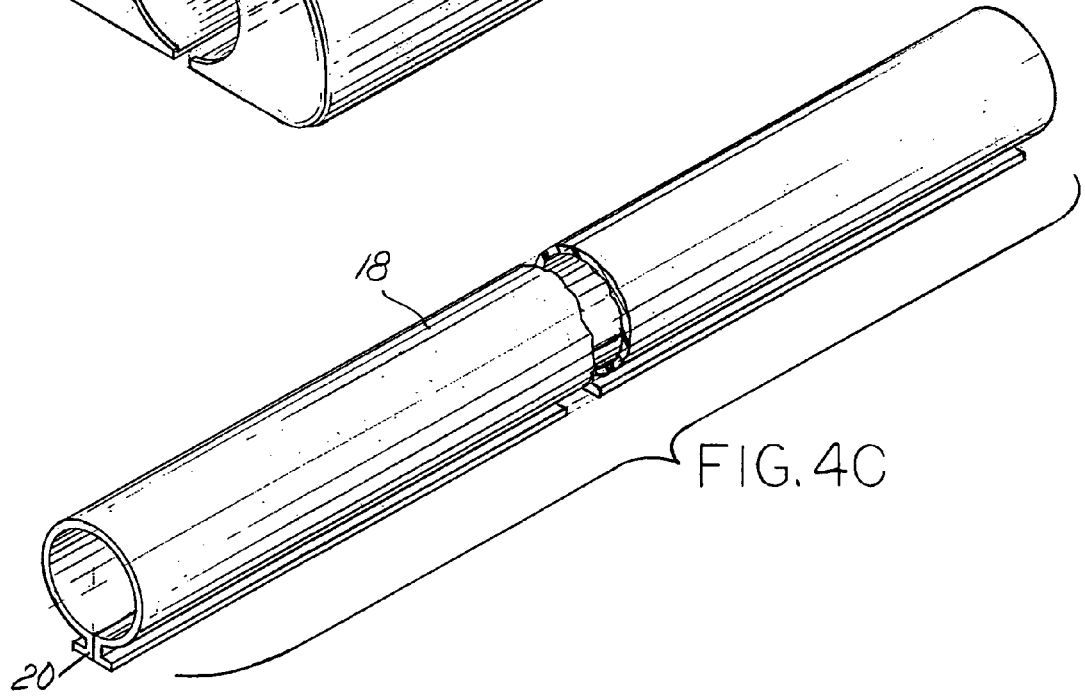

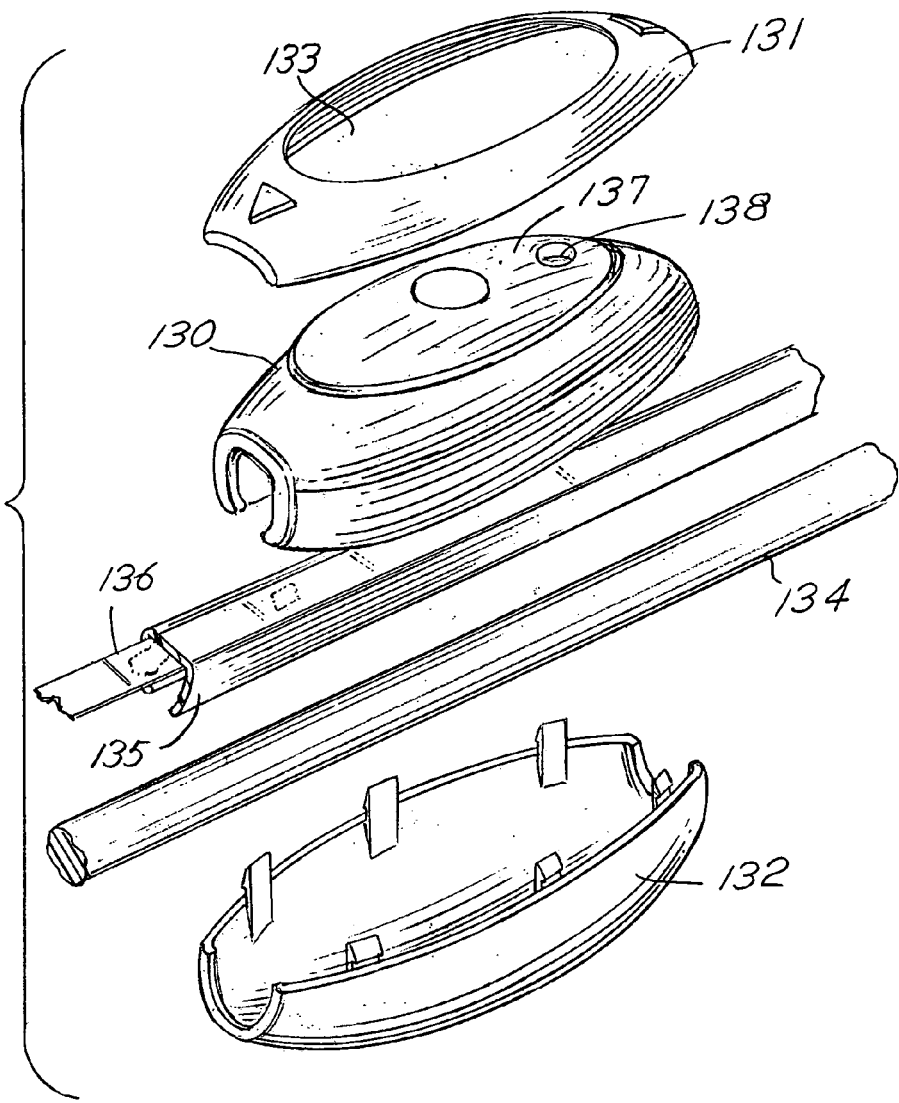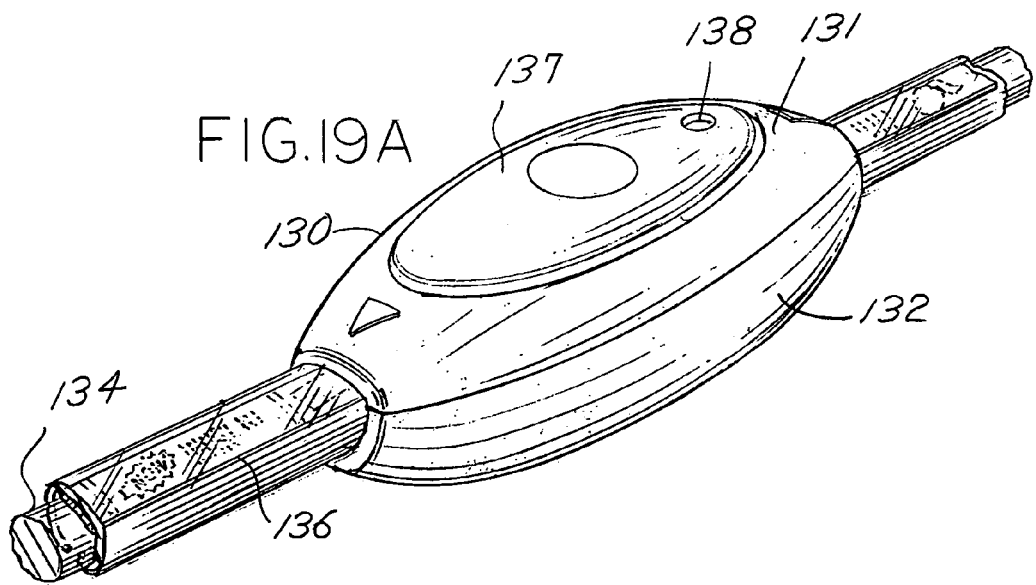

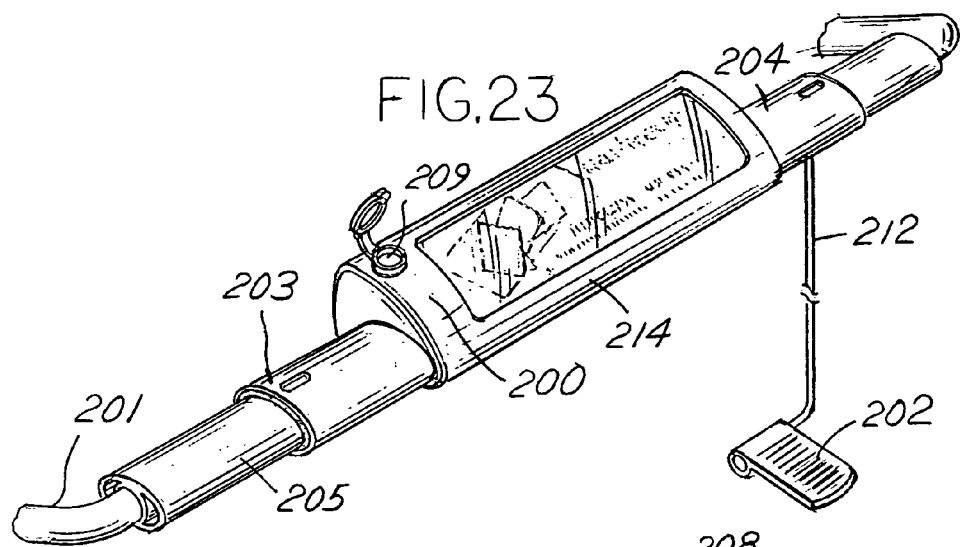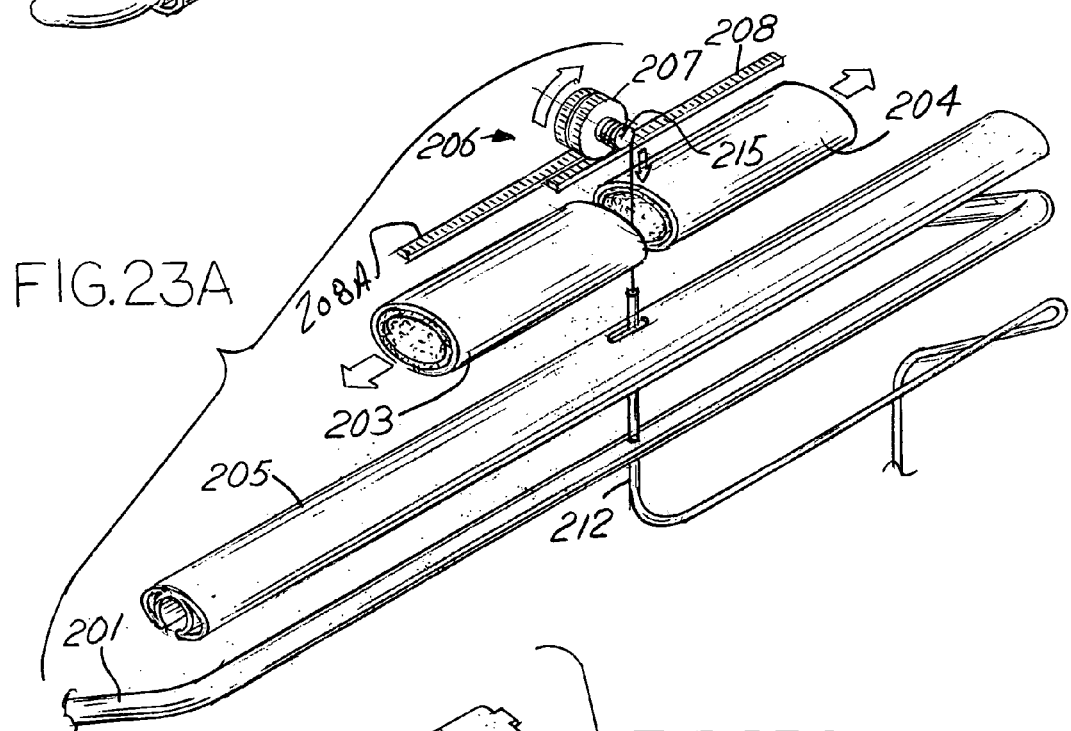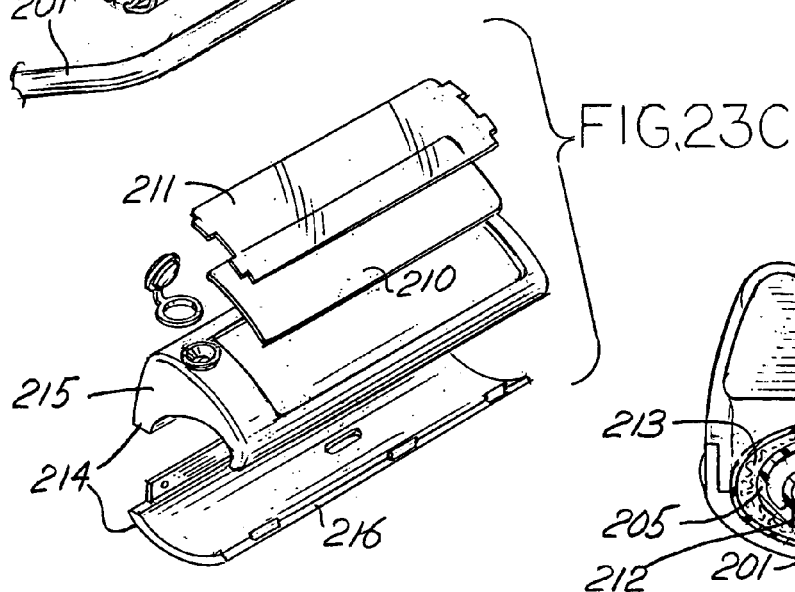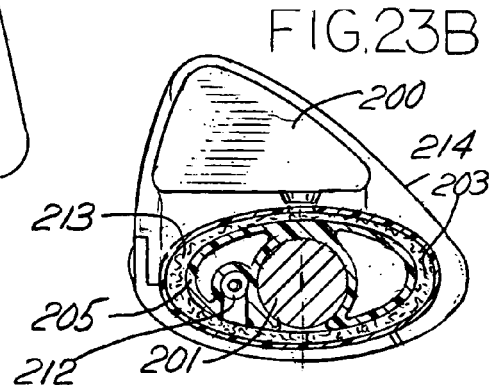

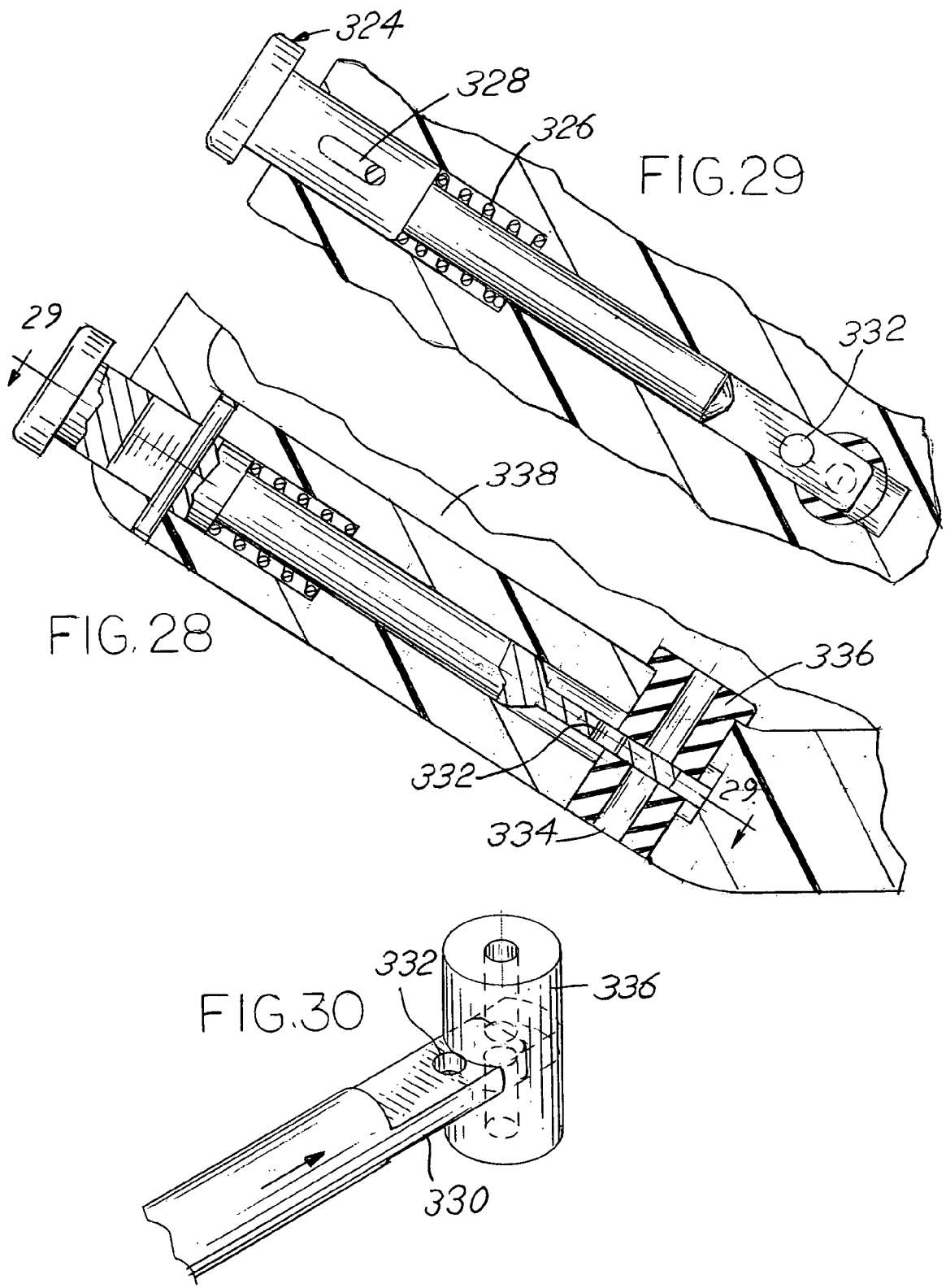

SANITIZING APPARATUS FOR SHOPPING CART HANDLES AND OTHER HANDLES

CROSS-REFERENCE TO RELATED APPLICATION

This is a Continuation-In-Part utility application incorporating by reference previously filed U.S. utility application Ser. No. 11/189,632 filed Jul. 26, 2005 entitled "Sanitizing Apparatus for Shopping Cart and Other Handles", which is related to and claims priority to U.S. provisional application Ser. No. 60/616,688 filed Oct. 7, 2004 and U.S. provisional application Ser. No. 60/684,112 filed May 24, 2005, both of which are entitled "Sanitizing Apparatus for Shopping Cart Handles". The prior applications are incorporated herewith by reference and priority is claimed with respect thereto to the extent permitted by law.

BACKGROUND OF THE INVENTION

In a principal aspect the present invention relates to shopping carts and similar product carriers including means to sanitize or clean and/or disinfect shopping cart handles as well as handles and hand rails that may be provided for various purposes.

Shopping carts and product carriers are commonly provided to a customer by retail stores as a convenient method to collect items and transport them through the store and from the store. Recent research, including a study by the University of Arizona, has shown that shopping cart handles are often unsanitary. Specifically, shopping cart handles were tested to determine their cleanliness and often showed much higher than normal levels of bacteria, germs, and viruses, some of which could pose a serious health hazard to persons unknowingly exposed to such pathogens. Although exposure to unsanitary shopping cart handles poses a potential health hazard to all persons, those especially at risk include children, the elderly, and other individuals with fragile immune systems. This risk is also applicable to other uses of handles such as those incorporated on doors, stairwells, walkways, and the like.

The cause for such high bacteria, germ and virus counts on shopping cart handles and other handles is not surprising given the vast number of people exposed to handles including those on shopping carts each day, and the standard cart maintenance programs recommended by manufacturers of shopping carts and employed by retailers. That is, shopping cart manufacturers typically recommend that shopping carts be pressure washed with water not exceeding 150 degree 2 to 3 times a year. This cleaning method is wholly inadequate to sanitize shopping cart handles. It is known that most pathogens cannot be killed using heated water unless they are exposed to water in excess of 160 degrees F. Accordingly, retailers wishing to protect their customers from the potential health hazards posed by unsanitary shopping cart handles must consider alternative methods. Likewise, handles used in other environments pose similar potential hazards.

In an effort to protect their customers from the potential health hazards posed by unsanitary shopping cart handles, some grocery store and other retailers have begun to offer their customers anti-bacterial and similar pre-treated wipes with which customers may use to wipe down their shopping cart handles to eradicate certain bacteria, germs, and viruses. An example of such a product is Sani-Cart brand wipes which are manufactured by Nice-Pak and marketed to grocery stores and other retailers for this purpose. Other options for sanitary protection include various reusable and disposable prophylactic devices applied to the cart handle to create a physical barrier between the shopping cart handle and the customer's hands. Some of these devices are designed to also cover additional portions of shopping carts, such as the children's seating area.

Unfortunately, the existing prior art methods and devices provide only limited protection from exposure to unsanitary shopping cart handles. Pre-treated wipes, although assumed to be effective in sanitizing shopping cart handles, if used properly, will not effectively protect every customer. This is true for two reasons. First, the inventory of pre-treated wipes and the shopping carts are riot always located in close proximity to one another. For example, shopping carts are often located in a store parking lot and a customer who takes a shopping cart from this or some other location may not have access to pre-treated wipes and thus will not be able to wipe down a shopping cart handle before making physical contact. Moreover, it would be commercially unreasonable and otherwise inconvenient for retailers to attach an inventory of pre-treated wipes to each and every cart. Instead, retailers will typically offer pre-treated wipes in only one location within the store, often near the main shopping cart storage location. The second reason is time. According to the manufacturers' product claims the antibacterial and antimicrobial agents used in such wipes require up to five minutes of direct exposure time after application to a handle surface before they kill many of the most dangerous bacteria, germs, and viruses. The typical customer is unaware of this product disadvantage and, even if aware, is typically not willing to wait to begin shopping.

Prophylactic barrier devices are also generally an ineffective means for protecting customers from exposure to unsanitary shopping cart handles. First, they are too expensive to be offered by retailers free of charge and therefore are typically only available for purchase. Second, due to the difficulty in applying such barrier devices (they are almost impossible to apply without touching the unsanitary shopping cart handle) even those customers who purchase such barrier devices may not be protecting themselves adequately since even casual contact with an unsanitary shopping cart handle is likely to result in the transfer of bacteria, germs, and viruses. A further risk of transmission occurs when such barriers are removed from the shopping cart, especially in the case of reusable barriers, which themselves may become unsanitary after each use and must therefore be sanitized (washed in water exceeding 160 degrees for several minutes) between use in order to offer any meaningful protection.

Finally, neither pre-treated wipes nor prophylactic barriers serve to reduce the average bacteria, germ, and virus count of shopping cart handles in any given store. This is because only those customers who are already aware and able to properly use of either of these protective devices will gain any protection. Those customers, who are not aware of the potential health hazard presented by unsanitary shopping cart handles and who do not use such devices, will continue to be exposed to the health hazard presented by unsanitary shopping cart handles.

Another option is customer use of sanitary gloves. This solution is expensive and time consuming. That is, the cost of sanitary gloves for each shopper is significant in order to guarantee an effective pathogen barrier. Issues of dispensing and disposal of the gloves also arise similar to the challenges of using wipes. Ironically, many store service personnel use and may be required to wear sanitary barrier gloves to protect spread of pathogens. Consequently, the risks of pathogenic exposure has been recognized, but the protective remedy has not been made available to the majority of those who are exposed to the risks.

In sum, the sanitization of shopping cart handles or any similar item which numerous and different individuals will be using remains highly challenging. The desire for a cost effective, functional and easily adopted system has heretofore been unsatisfied.

SUMMARY OF THE INVENTION

Briefly, the present invention comprises a sanitizing apparatus for shopping cart handles and the like, designed to allow customers who use shopping carts to sanitize the shopping cart handle before each use and continuously during use if desired. Moreover, the invention offers a level of protection to all customers, even those that do not employ the invention as a result of an increased average hygiene level of all shopping cart handles at a particular store site using the invention.

The apparatus generally comprises a housing constructed to fit over the shopping cart handle and dispense a protective fluid as the housing or a subhousing is moved to and fro over the elongate handle. Various embodiments of dispensing mechanisms and sanitizing or cleaning materials are disclosed which offer ease of dispensation or sanitization by the person using the cart. The devices may also be utilized, by way of example, in other environments and on other types of carts and transport apparatus having handles to effect pushing or pulling by a customer, patron or user. Thus, the devices disclosed may be incorporated on carry baskets, pallet and box moving equipment and the like. The apparatus may also be incorporated on door handles or door bars, handrails and other handle uses where the handle or rail is generally elongate.

In general, the invention comprises a device whereby liquid or other dispensable sanitizing agents are dispensed by brushing or coating the liquid or agent onto the elongate handle or cart handle or by spraying the material on the cart handle. Non liquid disinfecting materials or agents may also be utilized such as ultraviolet light directed onto the surface which is to be sanitized.

In a preferred embodiment a housing encloses a reservoir of liquid sanitizing material. A pump mechanism incorporated in the housing may be manually actuated to cause the fluid to flow from the reservoir within the housing onto one or more brushes which deposit the cleaning or sanitizing fluid onto the handle as the housing and brushes pass over the handle. The brushes may be designed to scrub the handle surface as well as to dispense and coat a sanitizing layer of disinfecting or sanitizing fluid. The reservoir within the housing is designed to receive refill fluid via injection through an inlet valve and passage or by replacement of the reservoir and its contents. Various means for refilling or replacing the reservoir are disclosed. Alternatively, a canister, capsule or container of sanitizing fluid or material may be inserted into the housing and replaced when empty.

The invention thus offers many objects and advantages over the prior art including but not limited to the following:

The invention is a convenient method for customers to sanitize the handle of their shopping cart, prior to usage, as the invention will be attached to every shopping cart handle and therefore always available to the customer regardless of where the shopping cart is located.

The invention offers a method for improving the average hygiene of shopping cart handles, within any store using the invention. Unlike the prior art the invention will, even if only used by a small group of customers each day, serve to reduce the average bacteria, germ and virus count on the average shopping cart handle. For example, if a store has an inventory of 200 shopping carts and caters to an average of 1000 shoppers each day, each cart will, on average, be used five times a day. If only 20% of all shoppers use the invention then every cart will, on average, be sanitized once per day. This will significantly reduce the bacteria, germ and virus count on each shopping cart handle as bacteria, germ, and virus growth will be impeded. Accordingly, not only those customers who use the invention but also those who do not will benefit from the invention.

The invention offers retailers a cost effective and commercially reasonable method for protecting their customers through the regular sanitization of shopping cart handles. Unlike the prior art, the invention offers retailers the ability to protect all customers at a low cost. This is an especially valuable advantage over the prior art because it allows retailers to meet a potential legal duty to protect all their customers without the need to offer additional education on the subject matter. By example, some grocery stores which have implemented a pre-treated anti-bacterial wipe program in their stores have also felt compelled to have signs explaining why customers should use the sanitizing wipes.

The invention is an environmentally sound means for sanitizing shopping cart handles as it does not create additional refuse.

The invention is not limited to use on shopping cart handles. The concepts of the invention may be incorporated on any elongate handle or hand rail including fixed as well as moving handrails such as utilized on escalators.

Further objects and advantages of the invention will become apparent from a consideration of the drawings and ensuing description.

BRIEF DESCRIPTION OF THE DRAWING

In the detailed description which follows, reference will be made to the drawing comprised of the following figures:

FIG. 3A is a side cross-sectional view of the embodiment of FIG. 1;

FIG. 3B is an enlarged partial side view of a handle connector element for the embodiment of FIG. 1;

FIG. 3C is an enlarged side view of a compatible side connector element embodiment of FIG. 1;

FIG. 4A is an isometric front side view depicting the housing for the embodiment of FIG. 1;

FIG. 4B is a front isometric view of an application and dispensing tube insert which fits into the main housing;

FIG. 4C is an isometric view of a replacement cart handle cover and rail mechanism used to attach the main housing to the shopping cart handle;

FIG. 19 is an exploded isometric view of a further alternative embodiment of the invention;

FIG. 19A is an isometric view of the assembled embodiment of FIG. 19;

FIG. 23 is an isometric view of a further embodiment of the invention;

FIG. 23A is an exploded isometric view of the embodiment of FIG. 23;

FIG. 23B is a cross sectional view of the embodiment of FIG. 23;

FIG. 23C is a further exploded isometric view of the housing and other component parts of the embodiment of FIG. 23;

FIG. 28 is a cross sectional view of an alternative construction of such a dispenser of the type generally depicted in FIG. 24;

FIG. 29 illustrates the dispenser of FIG. 28 in a cross sectional view when actuated; and FIG. 30 is a partial isometric view of the fluid dispensing arrangement associated with the valve mechanisms of FIGS. 28 and 29.

DESCRIPTION OF PREFERRED EMBODIMENTS

Figure 1:
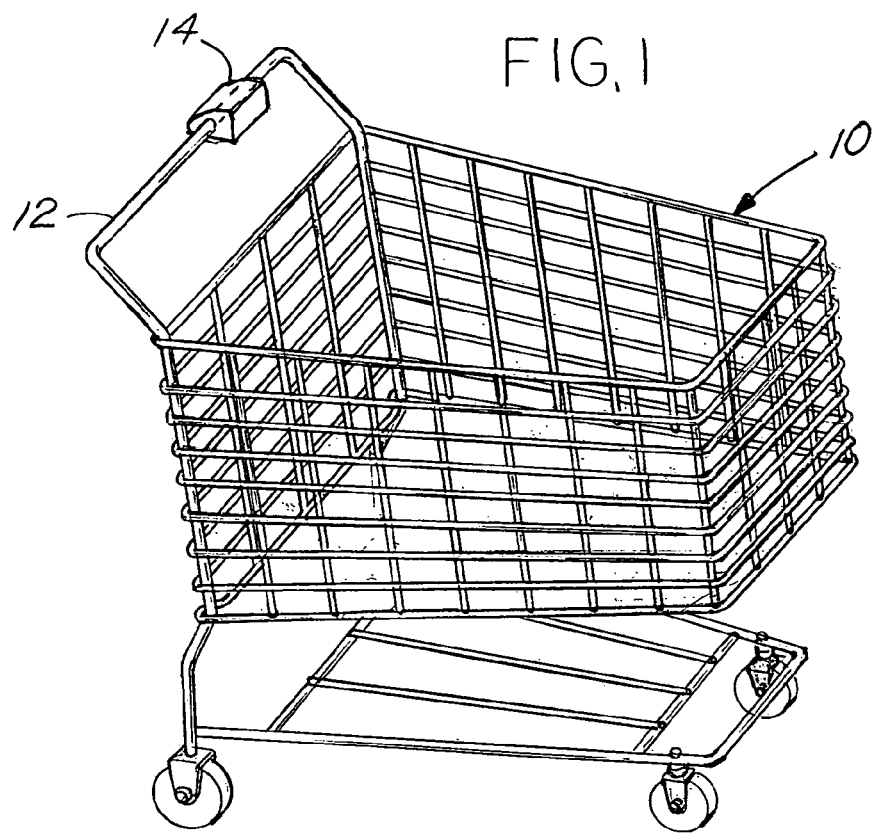
FIG. 1 is an isometric right side view of a typical shopping cart depicting an embodiment of the invention attached to the shopping cart handle.

Referring to the figures, FIG. 1 depicts a generic shopping cart 10, typically fabricated from plastic or metal, and having a generally straight handle 12 the cross-sectional shape of which is typically rounded and to which an embodiment 14 of the invention (i.e., sanitizing device or apparatus) is attached.

Figure 2:
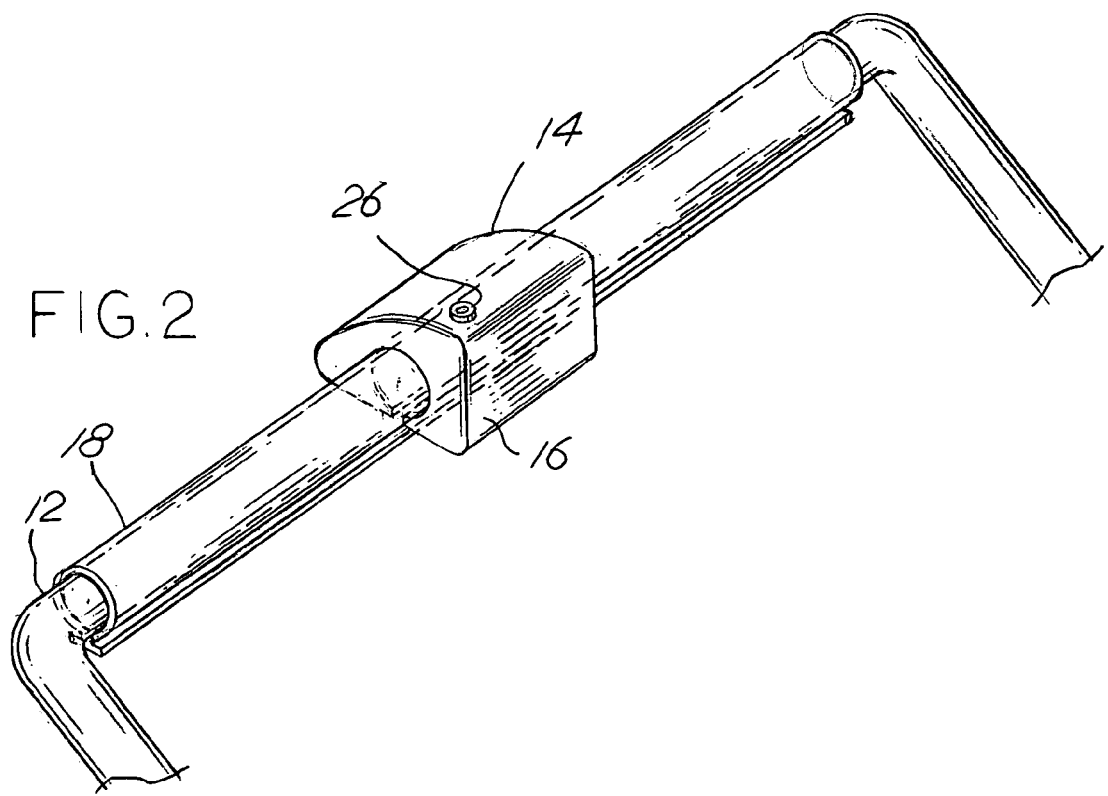
FIG. 2 is an enlarged isometric view of the embodiment of FIG. 1.

FIG. 2 is an isometric view of the sanitizing device 14 having a main housing 16 attached to the shopping cart handle 12 by means of a handle replacement cover and rail mechanism 18. That is, the original shopping cart handle 12 may include a cover typically made of hard plastic. The original cover or sleeve may thus be removed from the shopping cart handle 12 in order to expose the shopping cart handle shape which is typically round. The replacement cart cover and rail mechanism 18 is then attached to the handle 12 using, for example, a snap lock mechanism. Once installed over the shopping cart handle 12 the replacement cart cover and rail mechanism 18 provides a smooth and consistently shaped handle and a means for the attachment of the main housing 16 by means of a male/female connector (hereinafter described). Once attached the main housing 16 will easily slide laterally or from side to side along the replacement cart cover 18.

FIG. 3A is a cross-sectional view of the main housing 16 as attached to the replacement cover and rail mechanism 18, which is, in turn, attached to the cart handle 12. FIG. 3B is a detail of a projecting member 20 on the replacement cover and rail mechanism 18, the projecting member 20 acting as a female connector. In particular, a male connector 22 formed by a narrow region of the housing 16 as shown in FIG. 3C, engages with each side of the projecting member 20 by extending into the gap between the projecting member 20 and the main body of the replacement cover and rail mechanism 18, as is shown in FIG. 3A. In this manner, the main housing 16 is connected or keyed to the cart handle 12 via means of the replacement cover and rail mechanism 18. A reservoir 24 is retained within the housing 16 and a one-way reservoir refill valve 26 provides access to the reservoir 24. (See FIG. 7). The reservoir may comprise a separate bottle in housing 16. For example, a canister, capsule or container containing a sanitizing liquid or other material may be inserted into the housing 16 as disclosed with respect to FIG. 17, infra.

FIGS. 4A to 4C depict three primary components of the embodiment of FIGS. 1-3 including the main housing 16 shown in FIG. 4A, a fluid dispensing and spreading tube 28 shown in FIG. 4B and replacement cover and rail mechanism 18 shown in FIG. 4C. The main housing 16 fits over and cooperatively engages the dispensing and spreading tube 28, with both the dispensing and spreading tube 28 and the housing 16 being mounted on the replacement cover and rail mechanism 18. The main housing 16 shown in FIG. 4A is comprised of a molded plastic housing 16 with an internal reservoir 24 which may hold liquid, including, for example, an anti-bacterial liquid. The main housing 16 also contains a one-way reservoir refill valve 26 shown on the top right hand rear corner through which the reservoir 24 may be refilled using a nozzle or filling tube of appropriate dimensions.

The dispensing and spreading tube 28 comprises a partial cylindrical tube 30 open on both ends 31, 32 and having a slot 32A along its entire length. The dispensing and spreading tube 28 also contains three internal friction rings. The two internal rings 34, 36 or inwardly projecting flanges 34, 36 located at opposite ends of the dispensing and spreading tube 28 are low friction washer rings 34, 36 designed to allow the tube 28, once inserted into the main housing 16 to slide easily and longitudinally along the replacement cover and rail mechanism 18. The low friction washer rings or flanges 34, 36 also serve to spread the liquid agent dispensed along the length of the replacement cover and mechanism 18. Furthermore, rings 34, 36 will reduce the amount of air that may enter the dispensing and spreading tube 18 so as to avoid excessive evaporation of liquid from a third dispensing ring 38.

The dispensing ring 38 is located generally in the center of the dispensing and spreading tube 28 and is made of a felt material or similar porous material which will permit liquid from the reservoir 24 within the main housing 16 to be wicked and ultimately make contact with the replacement cover and rail mechanism 18. The dispensing and spreading tube 28 thus includes a hole 40 located immediately above the dispensing ring 38 for flow of fluid from reservoir 24 to ring 38. It should be noted that each of the rings referenced and shown in FIG. 4B include an appropriately sized gap in their circumference thereby allowing movement of the housing and tube 28 along the replacement cover and rail mechanism 18. FIG. 4C illustrates the configuration of the replacement cover and rail mechanism 18 prior to installation over the cart handle 12.

Figure 5A:
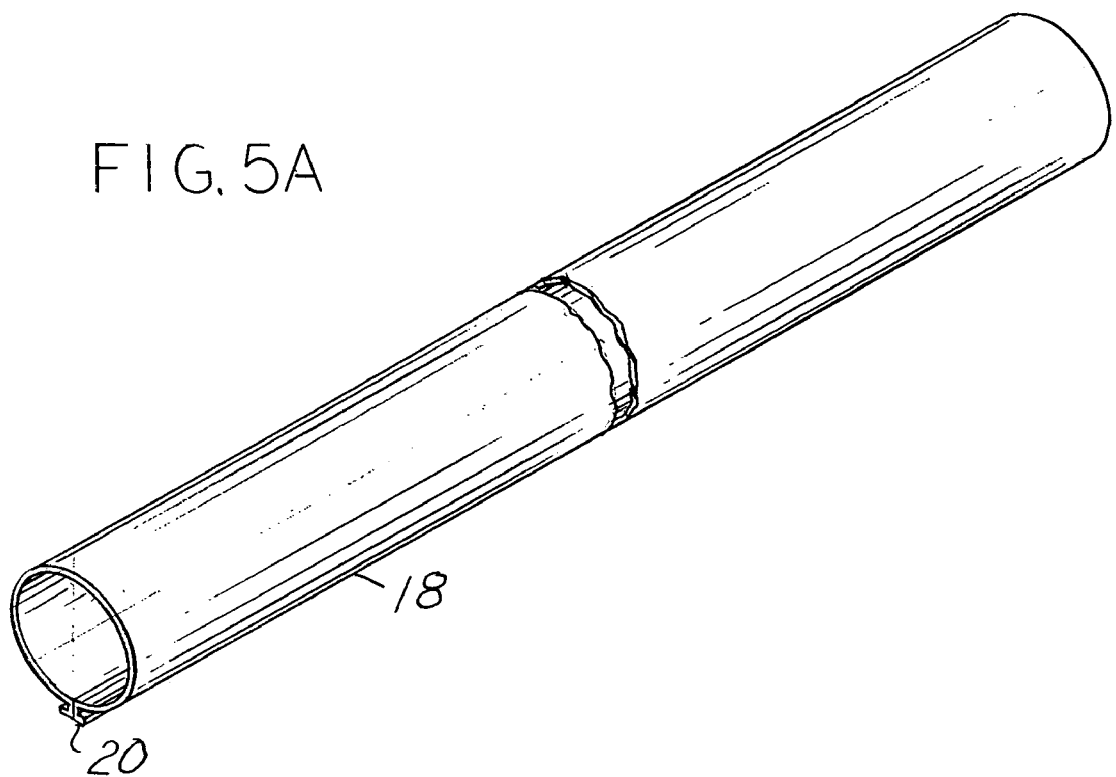
FIG. 5A is an isometric view of a replacement cart handle cover and rail mechanism.
Figure 5B:
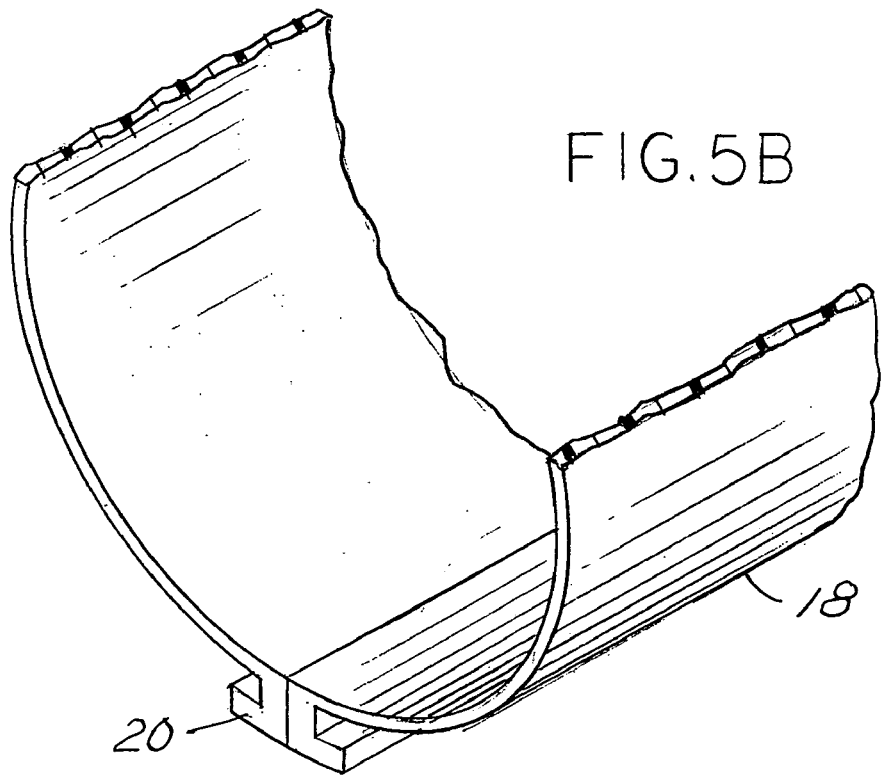
FIG. 5B is an enlarged isometric detail of the rail mechanism of FIG. 5A.

FIGS. 5A and 5B depict further details of the replacement cover and rail mechanism 18. FIG. 5B is an enlarged detail view of the connector 20 which is designed to accept the compatible connector 22 of the main housing 16.

Figure 6:
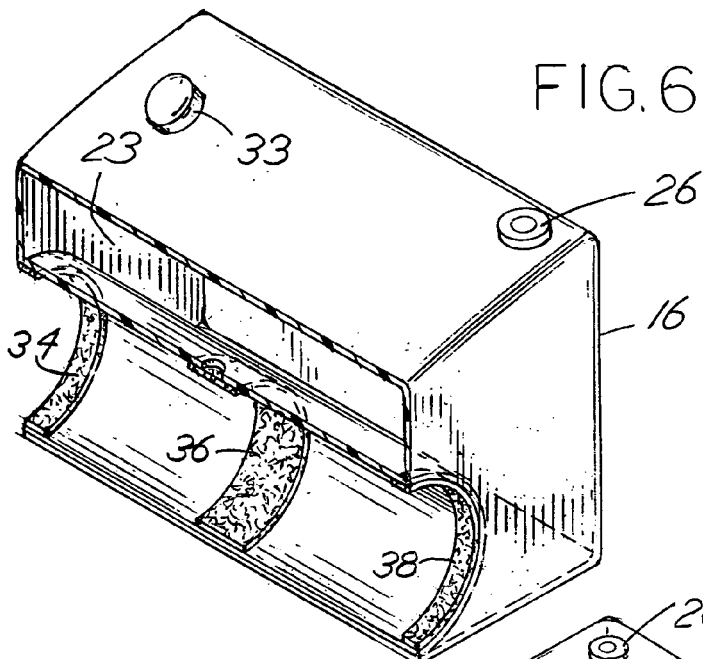
FIG. 6 is a cut away isometric view of the housing.
Figure 8:
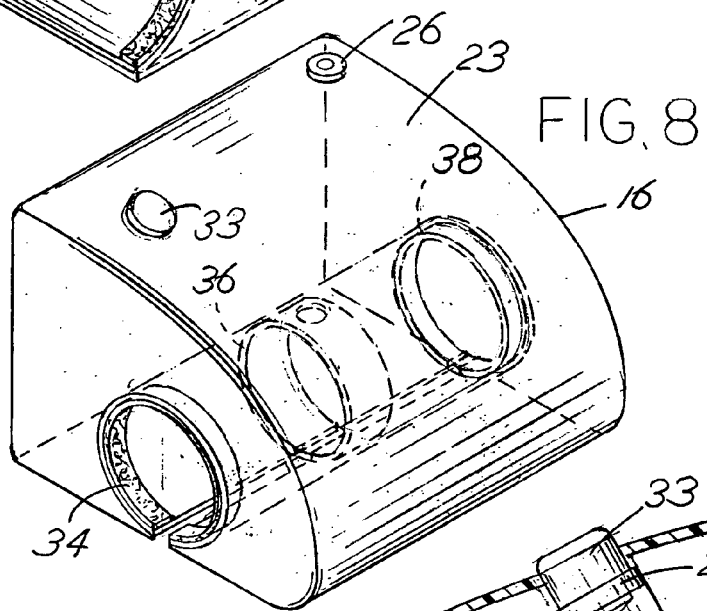
FIG. 8 is a front side isometric view of an alternative embodiment.
Figure 7:
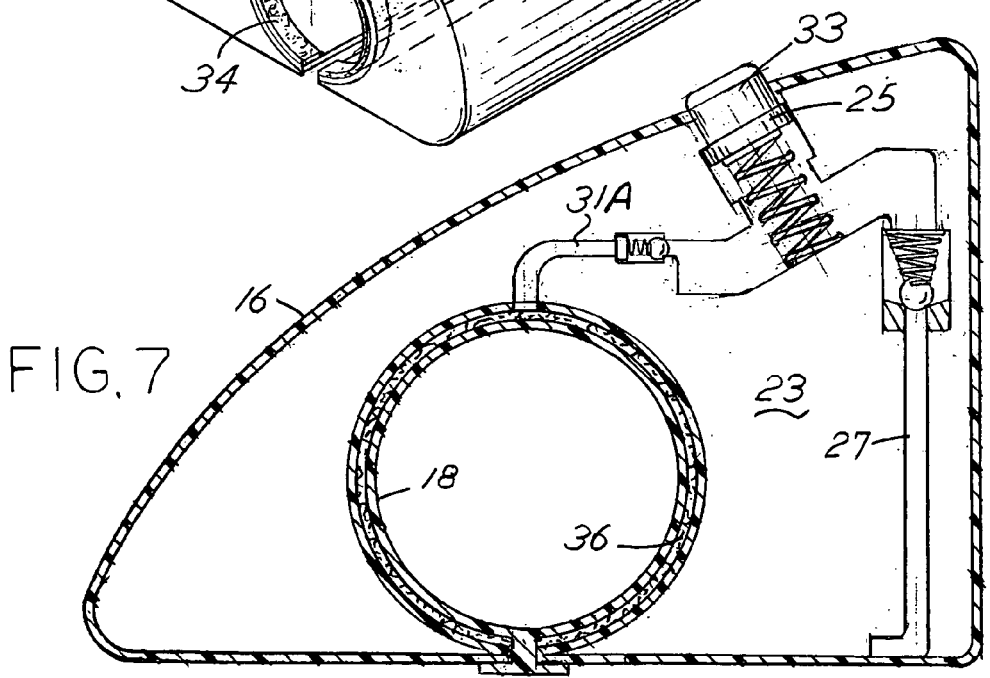
FIG. 7 is a cross-sectional view of an alternative embodiment of a dispensing means.
Figure 9:
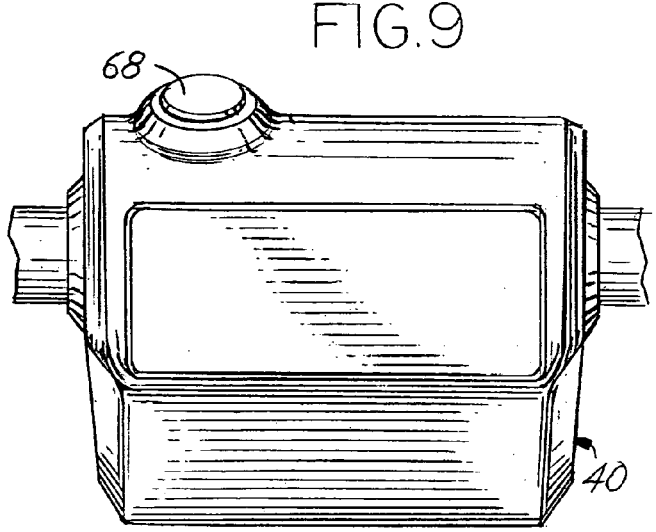
FIG. 9 is a front side view of an alternative preferred embodiment of the invention.
Figure 10:
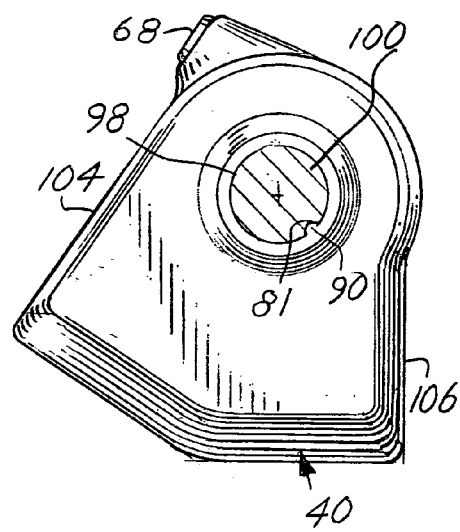
FIG. 10 is a top plan view of the apparatus of FIG. 9.
Figure 11:
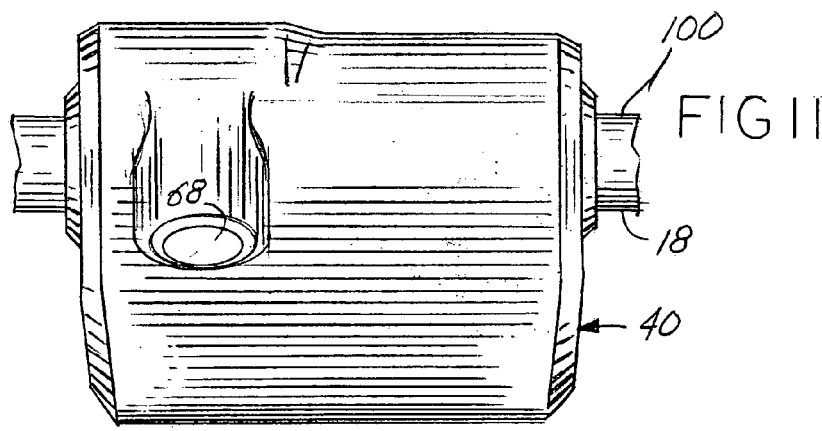
FIG. 11 is an end view of the apparatus of FIG. 9.
Figure 12:
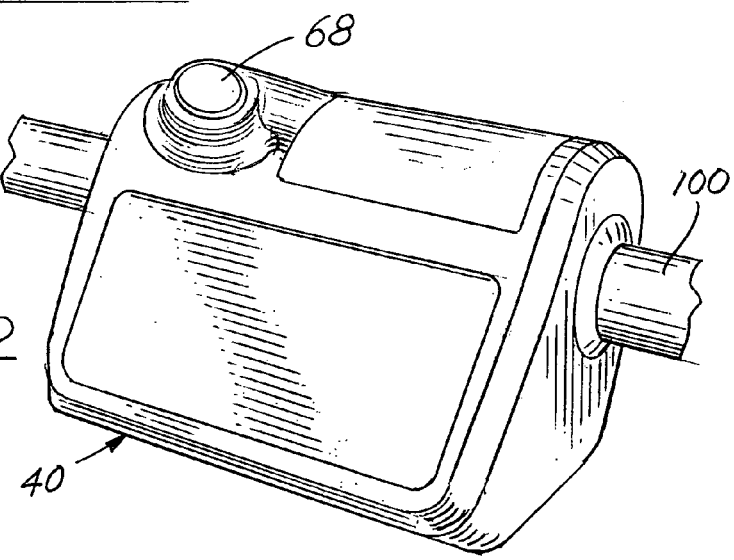
FIG. 12 is an isometric view of the apparatus of FIG. 9 as viewed from the front side.
Figure 13:
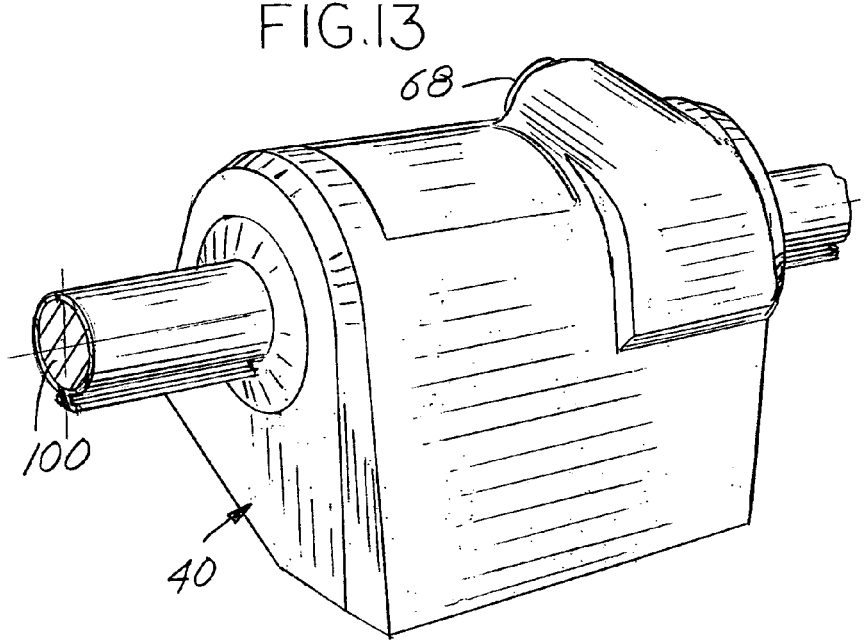
FIG. 13 is an isometric view of the apparatus of FIG. 9 as viewed from the backside thereof.

FIGS. 6, 7 and 8 depict an alternative embodiment of the invention incorporating an alternative means for dispensing and spreading liquid from reservoir 23 onto replacement cover and rail mechanism 18. This alternative embodiment employs dispensing and spreading tube 28 previously shown in FIG. 4B. Piston and cylinder pump mechanism 25 is used to move liquid from reservoir 23 through tube 27 into tube 31 and onto central spreader ring 36. Liquid pumped from reservoir 23 is then spread along the length of replacement cover and rail mechanism 18 by means of spreader rings 34 and 38 positioned at opposite ends of dispensing and spreading tube 28. Spreader rings 34, 36, 38 may be of a rubber-like material designed to spread dispensed liquid along the length of replacement cover and rail mechanism 18. Pump mechanism 25 is activated by pushing push button actuator 33 located on the exterior top left corner of main housing 16. Each push of push button actuator 33 causes the cylinder of pump mechanism 25 to depress thereby transferring a predetermined amount of liquid onto replacement cover and rail mechanism 18. Replacement cover and rail mechanism 18 remain unchanged in this alternative embodiment.

Figure 17:
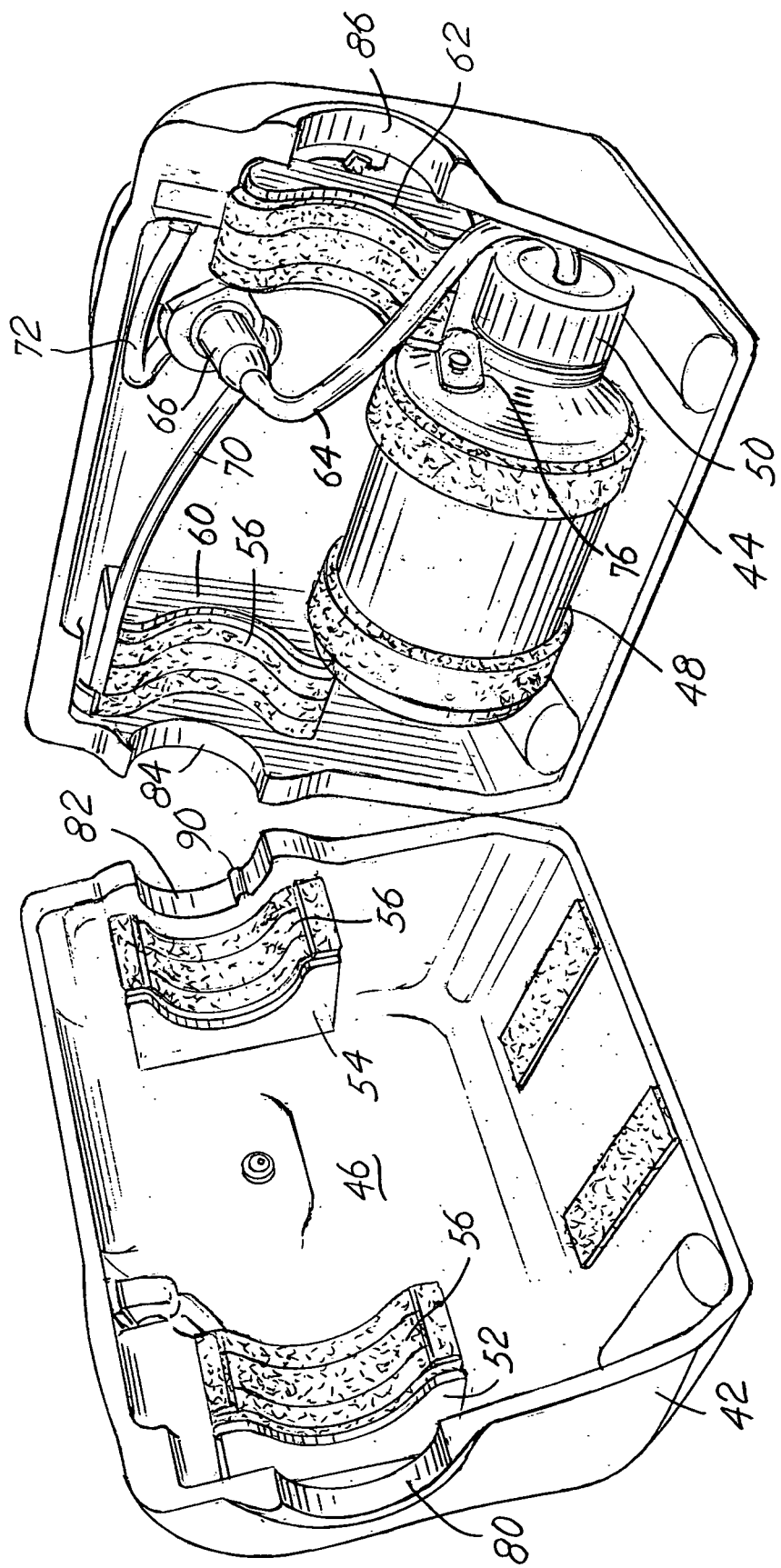
FIG. 17 is an isometric view of the apparatus of FIGS. 9-16 depicting the internal construction of the housing reservoir pump and applicators.

FIGS. 9-17 illustrate another alternative embodiment of the invention. The apparatus or device of the invention includes a housing 40. The housing 40 is comprised of first and second sections or shells 42 and 44 as illustrated in FIG. 17. Front section 42 is attachable to a back section 44 to provide an internal chamber 46. Positioned within the chamber 46 is a reservoir in the form of a bottle 48. The bottle 48 includes a removable cap 50 so that fluids, such as germicide, sanitizing fluid or the like, can be filled into the bottle 48. The front housing section 42 includes a first, internal, generally semi-circular molded retainer slot 52 and a second generally semi-circular retainer slot 54. Brush and applicator material 56 is incorporated into each of the slots 52 and 54. The back housing section 44 also includes retainer slots 60 and 62 into which applicator material 56 is fitted or placed. The various slots 52, 54, 60 and 62 are generally concave and semi-cylindrical in shape so as to permit the applicator material 56 to fit against, rub against or wipe against a handle bar of a shopping cart, for example.

A conduit 64 connects from the bottle reservoir 48 through the cap 50 to a pump mechanism 66. The pump mechanism 66 is operated by a push button 68 which is manipulated to pump fluid through conduits, such as conduit 70, and a secondary conduit 72 to the brush or applicator materials 56 in slots 52, 54 and 60, 62 respectively. The reservoir 48 includes a vent 76 which permits air inflow into the reservoir 48 as fluid is pumped therefrom.

Each of the sections 42 and 44 includes a generally semi-cylindrical passage or opening; such as the passage or opening 80 and 82 for the front section 42 and the passages 84 and 86 for the back section 44. The passages 80, 82, 84, 86 are shaped to conform generally to the configuration of the cross-section of the handle bar to which the apparatus or device is attached. This configuration enables sliding or transverse movement of the device on the shopping cart handle bar.

A feature of various embodiments of the invention maintains the orientation of the apparatus with respect to the handle bar. This may be accomplished in a number of ways. For example, the handle bar may include a key slot 81 which receives a key projection 90 projecting from the housing 40 in FIG. 17 to thereby ride in that slot 81 and maintain the orientation of the joined sections 42 and 44. Alternatively, the passages, such as the passage 98 in FIG. 10, may be non-circular and compatible with a similar non-circular handle bar such as the handle bar 100 in FIG. 12. In order to render the handle bar 100 non-circular, a sleeve having a non-circular cross-sectional profile, such as the sleeve 102 in FIG. 15 may be provided. The passage through the apparatus or housing 40 then will have a cross-sectional shape which is generally congruent with the cross-sectional shape of the sleeve 102 thereby ensuring that the apparatus will remain appropriately oriented with respect to the handle bar 100.

The housing 40, and more particularly the housing sections 42 and 44, typically will include planar surfaces, such as the planar surface 104 and 106, on the front and back side of the housing respectively on which advertising or information regarding shopping or other information may be provided. In addition, a coupon dispenser or multiple coupons from a pad of coupons may be positioned on a planar surface 104 or 106.

In operation, the housing 40 is moved laterally from side to side on the handle bar 100 by sliding it along the handle bar manually. In order to release or coat disinfectant cleaning fluid or the like, the push button 68 is manipulated to pump fluid from the reservoir 48 onto the internal brushes or applicator material 56 which wipe the handle 100. Gravity feeding or wick feeding may also be utilized for fluid transfer.

Figure 18:
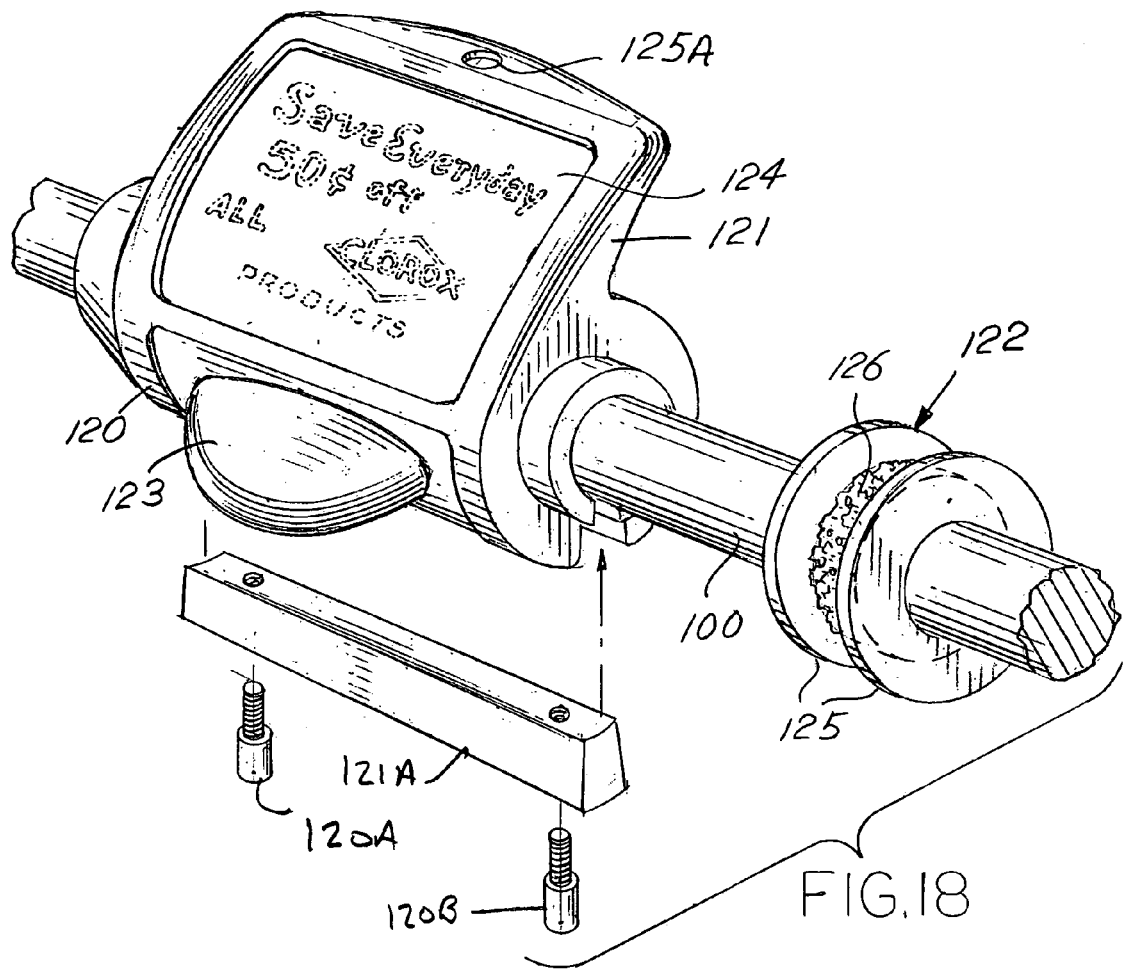
FIG. 18 is an exploded isometric view illustrating another alternative embodiment of the invention.

FIG. 18 illustrates an alternative embodiment of the invention. In this embodiment, a housing 120 containing a reservoir 121 is maintained generally in a fixed location at one side of the handle bar 100 and a reservoir applicator 122 docks with the reservoir. The reservoir applicator 122 may then slide on the handle bar 100 to apply cleaning fluid or the like.

The housing 120 includes a fill port 125A, by means of which the reservoir 121 can be re-filled with fluid (such as an anti-bacterial or germicidal solution). The fill port 125A may be provided with a cap or stopper to prevent unwanted spillage of the fluid, or with a one-way reservoir refill valve. The housing 120 also includes a surface 124 upon which advertisements can be displayed. Preferably, replaceable advertisements are attached to the surface 124 and are covered by a layer of clear, protective plastic.

In addition, the housing 120 has a push button 123 that can be activated by a use to dispense (apply) fluid to the reservoir applicator. For example, the push button 123 may be linked to a pump mechanism of a similar type to the pump mechanisms 25 and 66 already described with reference to FIGS. 6 to 8 and 9 to 17, respectively.

The reservoir applicator comprises a casing 125 in which brush or applicator material 126 is housed. The casing 125 substantially comprises two generally circular disks each provided with an aperture at a central region to accommodate the handle bar 100. The brush or applicator material 126 is positioned between the disks of the casing 125, such that it contacts a ring of the outer surface of the handle bar 100.

Figures 18A, 18B:
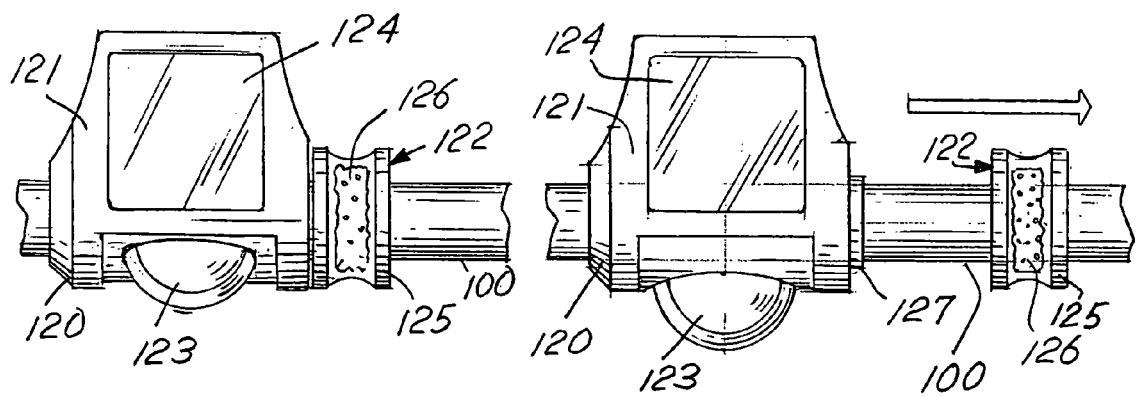
FIG. 18A is a front schematic view of the embodiment of FIG. 18 illustrating the method of operation thereof.
FIG. 18B is a front plan schematic view of the embodiment of FIG. 18 illustrating the manner of use of the embodiment.

To recharge the brush or applicator material 126 with fluid, the reservoir applicator 122 is docked with the housing 120 as shown in FIG. 18A. In this regard, the reservoir applicator may engage with a flange 127 provided on the housing 120, the flange 127 being shown in FIG. 18B. Fluid is then dispersed to the reservoir applicator when the user depresses the push button 123. The fluid may, for example, be ejected onto the brush or applicator material through holes provided in the flange 127 and casing 125. Alternatively, one or more conduits may extend longitudinally (i.e., along the axis of the handle bar 100) from the brush or applicator material 126, through the casing 125, to engage with respective conduits or valves connected to the reservoir. In a preferred mechanism, an inner edge at the casing 125, on the side of the reservoir applicator 122 that engages with the flange 127, is distanced from the handle bar 100, to enable fluid to pass from the reservoir to the brush or applicator material 126. As another alternative, a reservoir may be positioned at each end of a bar with an applicator 122 that can be cycled between the reservoirs. In that way each reservoir may include a unique sanitizing agent or an additional agent such as a cosmetic or cream.

The housing 120 may be snap-fitted around the handle bar 100 and fastened to the handle bar 100 using tamper resistant fasteners 120A, 120B and a bar 121A, to maintain the reservoir 121 at a fixed location of the handle bar.

FIG. 19 is an exploded isometric view at a further alternative embodiment of the invention. Here, a reservoir 130 is snap-fitted to a shopping cart handle bar 134 by means of a snap-fit mechanism. Upper and lower casings 131, 132 are the snap-fitted over the handle bar 134 and reservoir 130. The upper and lower casings 131, 132 comprise a rigid material, such as plastic. An apparatus 133 is provided in the upper casing 131, so that an upper portion 137 of the reservoir 130 is exposed when the device is assembled, as shown in FIG. 19A. At least some of the upper portion 137 comprises a flexible material that can be depressed by a user.

Accordingly, fluid, such as anti-bacterial or germicidal solution, can be dispensed from the reservoir by manual manipulation of the reservoir by the user. Preferably, the flexible material at the upper portion 137 of the reservoir 130 is resiliently biased, such that it returns to its original configuration when downward force is no longer applied, thus providing tactile feedback to the user. The fluid may be dispensed from the reservoir, for example, using an applicator pad or one or more dispenser rings such as those described earlier.

A fill port 138 is provided in the upper portion of the reservoir, to enable the reservoir to be re-filled. A one-way valve, cap or stopper may be provided to prevent leakage from the fill port 138.

In the embodiment of FIGS. 19 and 19A, the device is not mounted directly on the handle bar 134, but rather is mounted on a sheath 135 which is, in turn, mounted on the handle bar 134. The sheath 135 has a rectangular upper surface comprising a clear (transparent) material such as plastic. A strip 136 on which advertisements are printed may be provided inside of the sheath 135, such that the advertisements are visible through the clear material. By detachment of the various snap-fitted components, the strip 136 can be replaced when desired. The device of this embodiment is movable along the handle bar 134, such that the entire length of the surface of the sheath 135 can be cleaned or sanitized.

Figure 20:
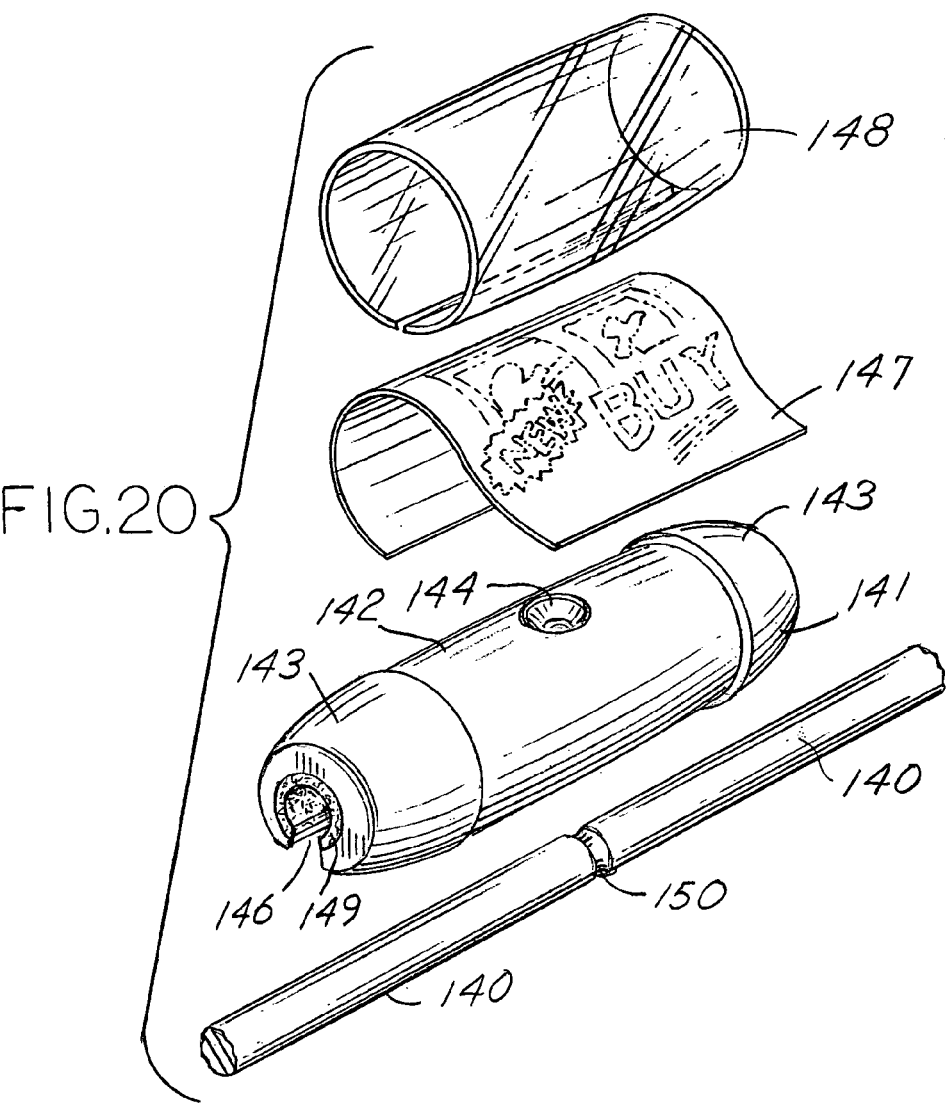
FIG. 20 is an exploded isometric view of a further embodiment of the invention.
Figure 20A:
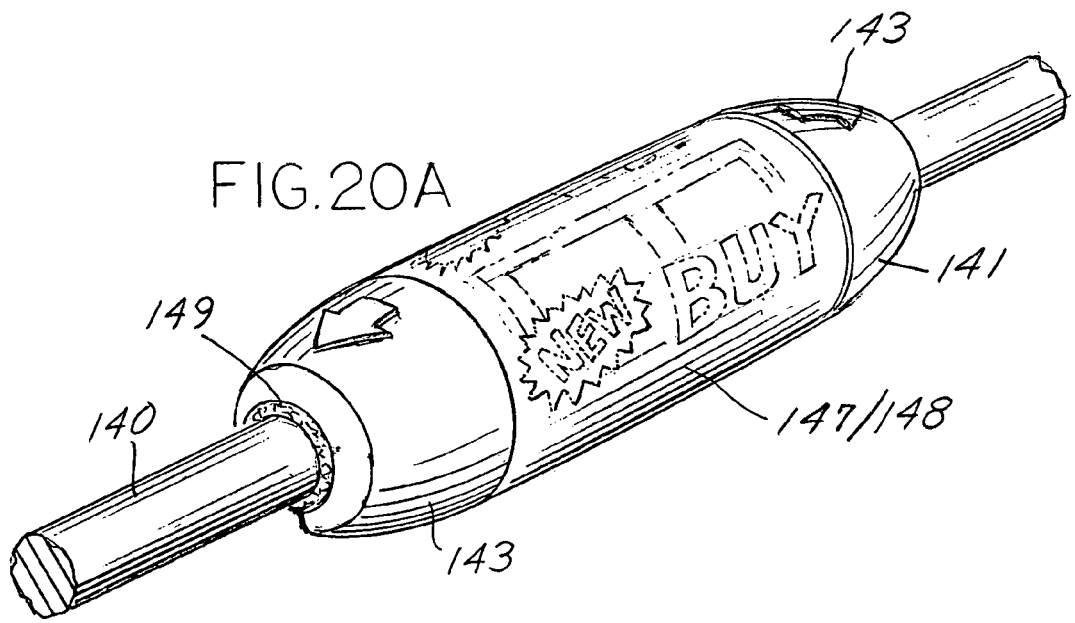
FIG. 20A is an isometric view of the assembled embodiment of FIG. 20.

FIG. 20 is an exploded isometric view of a further embodiment. In the embodiment of FIG. 20, the handle bar 140 is generally circular and the applicator device 141, which may be moved from side to side, includes a center detent mechanism which allows the device to be positioned in a retained center position when not being manipulated and moved from side to side. The applicator device 141 shown in FIG. 20 comprises an approximately cylindrical central section 142 and end sections 143 provided on either side of the approximately cylindrical central section 142. A fill port 144 is provided in an upper surface at the central section 142, so that a reservoir, housed within the applicator device may be re-filled. A one-way valve, cap or stopper may be provided in the fill port 144 to prevent leakage of cleaning fluid from the reservoir. A slot or passage 146, having a substantially circular cross-section but being open on one side, runs along the length of the applicator device 141 on a lower surface of the device opposite to the fill port. The device may be positioned with the slot or passage 146 over the handle bar 140, and can then be snap-fitted around the bar, as is shown in FIG. 20A. Also, as shown in FIGS. 20 and 20A, a roll of material 147 with advertisements printed thereon may be provided on the central section 142 of the device, with a transparent protective plastic sheet 148 provided over the advertisement material.

A length of applicator pad or brush material 149 lines the inside surfaces of the slot or passage 146, such that the applicator pad or brush material 149 contacts the surface of the handle bar 140, as shown in FIG. 20A. A series of pin holes are provided in the lower surface of the reservoir, enabling the cleaning fluid the wick onto the applicator pad or brush material 149, to be dispensed onto the handle bar 140.

As can be seen in FIG. 20, the handle bar 140 includes a center detent 150. One or more projecting spurs or a projecting ring of material are provided in the center of the slot or passage 146 of the device 141 to engage with the center detent 150. In this way, the center detent mechanism is provided, enabling the device to be retained at a center position. If sufficient sideways force is applied to the device 141, it will move away from the center detent position. A replacement handle bar cover may be used for the handle bar 140, to provide the center detent.

Figure 21:
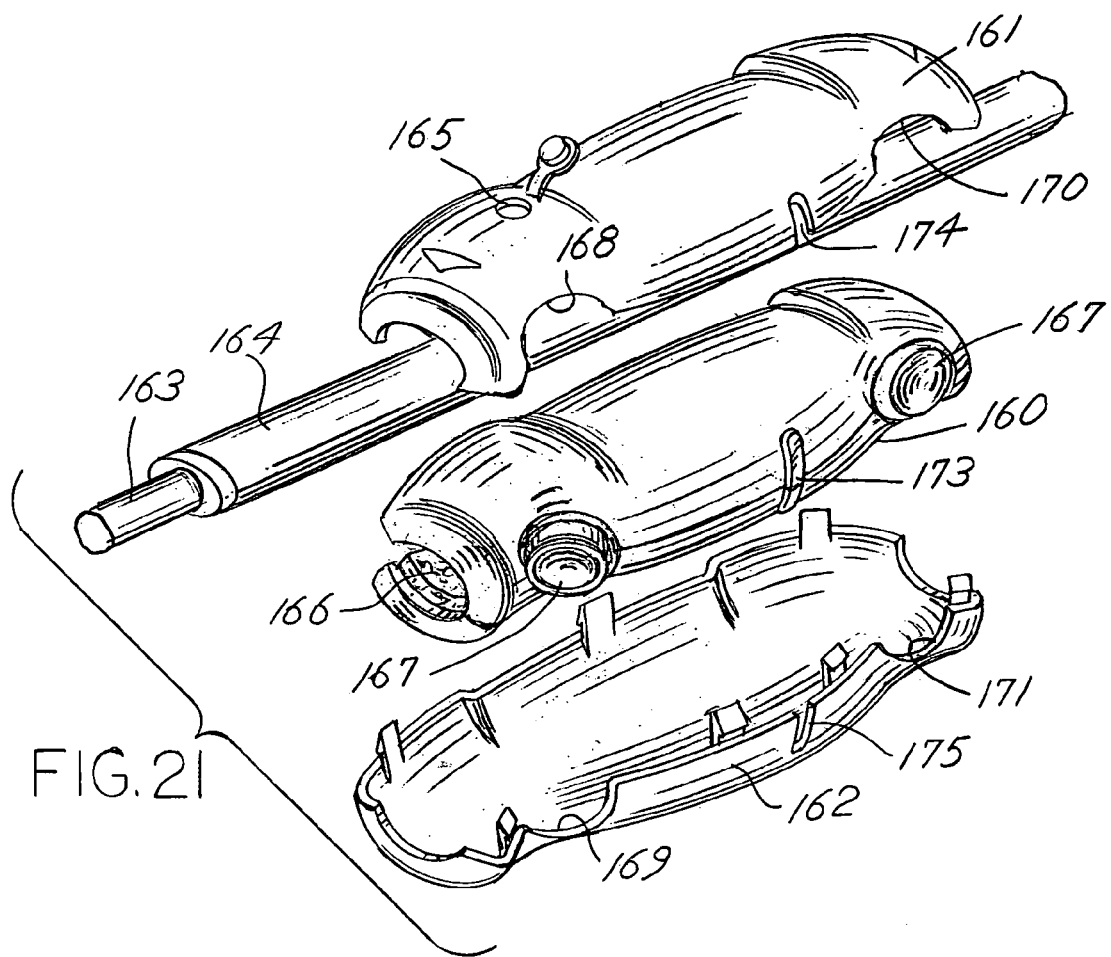
FIG. 21 is an exploded isometric view of a further embodiment of the invention.

FIG. 21 is an exploded isometric view of a further embodiment of the invention, wherein a reservoir 160 is retained within first 161 and second 162 housing sections. The reservoir 160 and housing sections 161 and 162 may be snap-fitted to a handle bar 163, or sheath 164 mounted on the handle bar 163, in a similar manner to that described with reference to FIGS. 19 and 19A. Furthermore, advertisements may be displayed underneath the sheath 164. A fill port 165 is provided in the first (here, upper) housing section 161, with a corresponding port or aperture provided in the reservoir 160. A one-way valve, cap or stopper may be provided to prevent leakage of a cleaning fluid from the fill port 165.

Figure 21A:
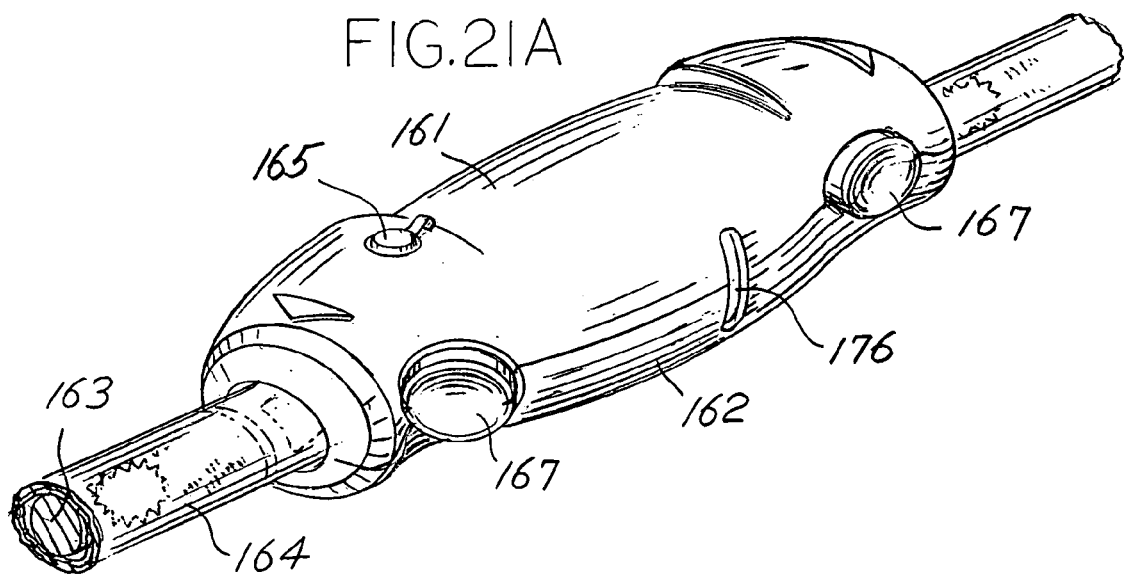
FIG. 21A is an isometric view of the assembled embodiment of FIG. 21.

In this embodiment, the reservoir 160 is provided with brush material or an applicator pad 166, to dispense cleansing fluid onto the sheath 164. Furthermore, buttons 167 are molded into the reservoir 160, the buttons activating deformable valves to allow the cleaning fluid to bleed (soak) into the applicator pad 166. Openings or indents 168, 169, 170 and 171, each generally semi-circular in shape, are provided on the first and second housing sections, so that the buttons 167 protrude through the housing sections in the assembled device, as depicted in FIG. 21A.

Furthermore, a substantially transparent, vertically extending portion 173 is formed in the outer surface of the reservoir 160, such that the fluid level in the reservoir can be viewed through the portion 173. Indentations 174, 175 are formed in the first and second casings 161, 162, respectively, the indentations matching the shape of the transparent, vertically extending portion 173. Thus, in the assembled device, as shown in FIG. 21A, a fluid level monitoring window 176 is formed.

Figure 22:
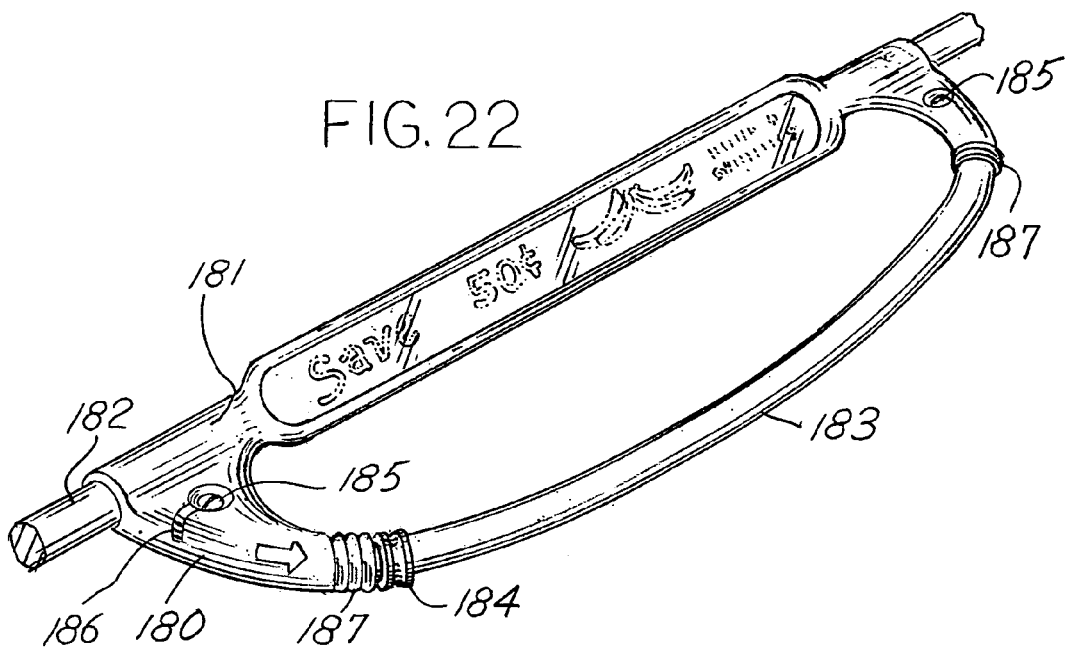
FIG. 22 is an isometric view of a further embodiment of the invention.

FIG. 22 illustrates a further embodiment of the invention, wherein a reservoir 180 is incorporated in an attachment 181 to a handle bar 182 and an auxiliary handle bar 183 is provided with an applicator 184 slidable thereon. The applicator 184 is designed to dock with the reservoir 180 and receive germicidal fluid, for example, for application to the auxiliary handle bar. The shopping patron (user) will then move the cart by means of the auxiliary handle bar 183. The attachment 181 may be snap-fitted to the handle bar 182, and can be secured, for example, by means of anti-tamper fasteners or by means of engagement with a replacement cover and rail mechanism provided on the handle bar 182.

Figure 22A:
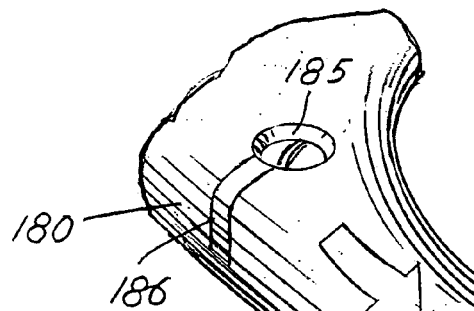
FIG. 22A is a partial isometric view illustrating the operation of the embodiment of FIG. 22.

A fill port 185 is provided on the attachment 181 to enable the fluid in the reservoir 180 to be re-filled, as shown more clearly in FIG. 22A. In addition, a window 186 comprising a strip of transparent material is formed in the attachment 181, shown adjacent to the fill portion 185 in the figure, to enable the fluid level to be monitored. Horizontal lines may be marked on the window material to help the user gage the fluid level. In the particular embodiment depicted, two fill ports 185 are provided, one at each end of the attachment 181, between the handle bar 182 and the auxiliary handle bar 183.

Figure 22B:
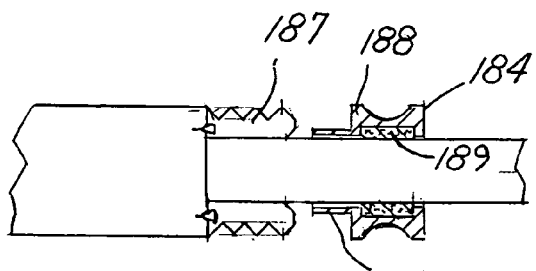
FIG. 22B is a schematic view of the method of operation of the embodiment of FIG. 22.

Sealing means 187 are provided on the reservoir 180 at each end of the auxiliary handle bar 183, the applicator 184 being designed to dock against the sealing means 187. The sealing means ensure that fluid is dispensed from the reservoir 180 only when the applicator 184 is docked against the sealing means 187. The sealing means comprises a compressible material, for example a rubber material, and is resiliently biased in a first, sealed configuration, as shown in FIG. 22B, in which the egress of fluid from the reservoir 180 is prevented. When the applicator 184 is docked against the sealing means 187, the sealing means 187 is deformed into a second, dispensing configuration, in which fluid is dispersed from the reservoir.

Figure 22C:
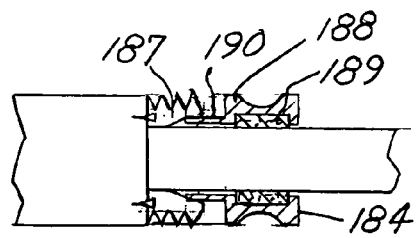
FIG. 22C is a further schematic illustrating the method of operation of the embodiment of FIG. 22.

In this regard, the applicator 184 comprises a housing 188 and brush or applicator material 189. As can be seen in FIGS. 22B and 22C, the housing 188 includes a laterally projecting sheath 190 distanced by a small amount from the surface of the handle bar 183.

As the applicator 184 is pushed against the sealing means 187, the sheath 190 engages with the sealing means 187 and compresses the sealing means. Furthermore, the sheath 190 slides underneath the sealing means 187, enabling the fluid to flow from the reservoir into the applicator 184 and onto the brush or applicator material 189.

FIG. 23 is an isometric view of a further embodiment, wherein a housing 214 containing a reservoir 200 is maintained in a fixed position on a handle bar 201 generally centrally located on the handle bar and a foot pedal 202 is provided to cause applicator pads 203, 204 to move inwardly and outwardly from the reservoir 200 to thereby disinfect and clean the handle bar. As can be seen in the exploded isometric view of FIG. 23A, a sheath 205 is provided to cover the handle bar 201, the sheath being snap-fitted to the handle bar in the assembled device, as shown in FIGS. 23 and 23B, where FIG. 23B is a cross-sectional view of the assembled device. The housing 214, containing the reservoir 200, comprises a first and second casings 215 and 216, as shown in FIG. 23C. In the assembled device, the casings 215, 216 are joined together around the sheath 205 to form the housing 214, as shown in FIG. 23. A fill port 209 is provided in the first casing to enable the fluid in the reservoir 200 to be re-filled.

As can be seen in FIGS. 23 and 23B, the applicators 203 and 204 are mounted on the sheath 205 in the assembled device. Each applicator 203, 204 houses an applicator pad 213 to apply cleaning fluid to the sheath 205.

In their neutral position, when the foot pedal 202 is not depressed, the applicators 203 and 204 are positioned on either side of the housing 214 containing the reservoir 200, as shown in FIG. 23. A cable 212 extends from the foot pedal 202, through the sheath 205, and engages with a rack and pinion mechanism 206 comprising a pinion 207 and racks 208, 208A. This can be seen in FIG. 23A. Each applicator 203, 204 is connected to a respective one of the racks 208, 208A. Thus, when the user depresses the foot pedal 202, the cable 212 is pulled downwards also, and this, in turn, causes the pinion 207 to rotate, by means of a rotating shaft 215, thus moving the attached applicators 203, 204 along the sheath 205 via the racks 208 and 208A. As can be seen in FIG. tube 28B, the cable 212 is routed through the sheath 205.

When the applicators 203 and 204 are in the neutral position, they are replenished with fluid from the reservoir 200. FIG. 23B shows how the fluid drips or wicks onto the applicator pad 213 of applicator 203 through a slot in the sleeve of the applicator 203.

Furthermore, as shown in FIG. 23C, the first casing 215 of the housing 214 comprises a region for the attachment and display of removable advertisements. Thus, a sheet 210 having one or more advertisements provided thereon is attached to this region, with a clear protective plastic sheet 211 arranged above the sheet 210 to protect it from damage. An advertisement is thus displayed on the housing, as shown in FIG. 20.

The embodiment of the invention as described in FIGS. 1 to 5 operates as follows: The user grasps the main housing 16 of the sanitizing device 14 and moves it back and forth along the entire length of the replacement cover and rail mechanism 18 at least once. During this movement, the dispensing ring 38, which is moist with anti-bacterial or similar liquid sanitizing agent, the agent dispenses and thus coats substantially all of the replacement cover and rail mechanism 18 thereby sanitizing the same. The low friction washer rings or flanges 34, 36 ensure that the main housing 16 moves smoothly along the replacement cover and rail mechanism 18 and prevent the main housing 16 from tipping to either side. The connection of the main housing 16 to the replacement cover and rail mechanism 18 by means of the female and male connectors 20 and 22 respectively, ensures that the pressure created by the force of the user's hand motion is distributed equally along the rail mechanism and, therefore, prevents any obstruction to its normal operation.

The alternative embodiment of the invention as described in FIGS. 6 to 8 is operated in a similar manner to the embodiment of FIGS. 1-5, except that the user must depress the push button activator 33 prior to moving the main housing 16 along the entire length of the replacement cover and rail mechanism 18.

The embodiments of FIGS. 9-23 are functionally similar to the embodiments of FIGS. 1-8. For example, in FIGS. 9-17 as well as with respect to FIGS. 19, 20 and 21 a reservoir is maintained within a housing which is moved laterally from side to side on a handle bar. The shape and configuration of the reservoir and/or the housing for the reservoir can be adjusted to accommodate the shape and configuration of the handle bar. Typically, the reservoir is keyed to the handle bar so that it will not rotate with respect thereto about the longitudinal axis of the handle bar. The reservoir may be fixed to a side or in the middle of a handlebar or handrail and a slidable applicator may be provided to dock with the reservoir and absorb fluid or a sanitizing agent. Movement of the applicator may then apply the sanitizing material to the bar or rail.

Figure 14:
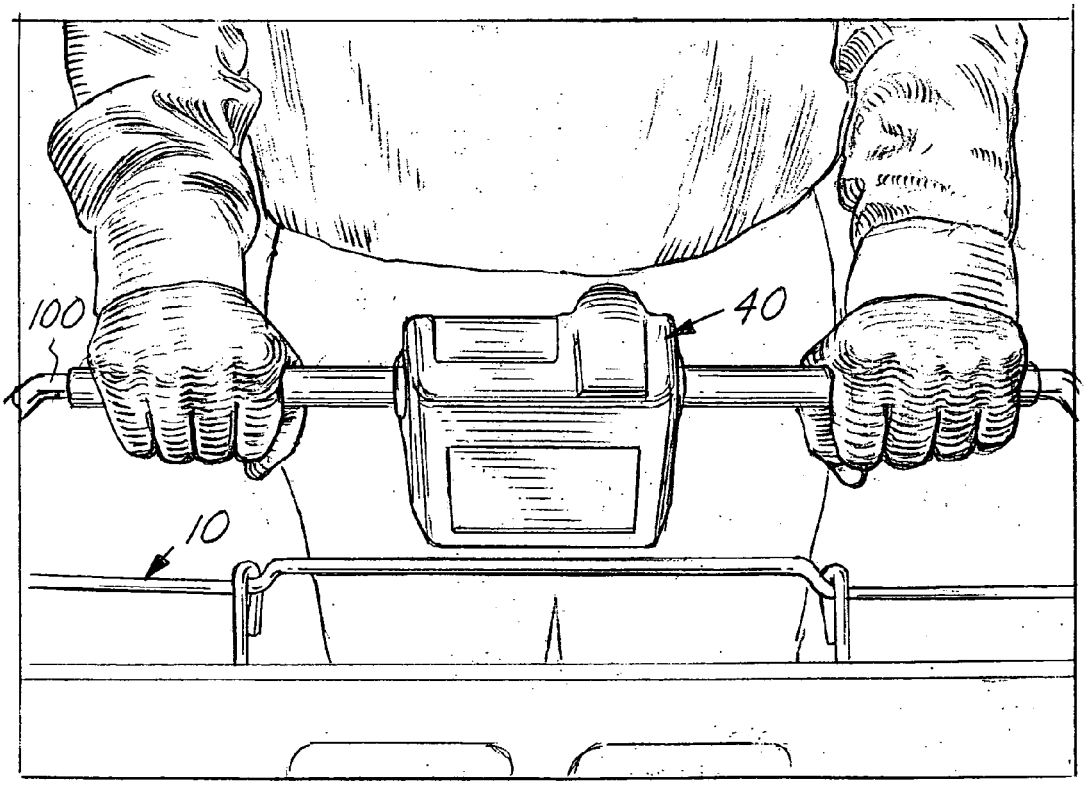
FIG. 14 is an isometric backside view depicting the apparatus generally depicted in FIGS. 9-13 as attached to a typical shopping cart handle.
Figure 15:
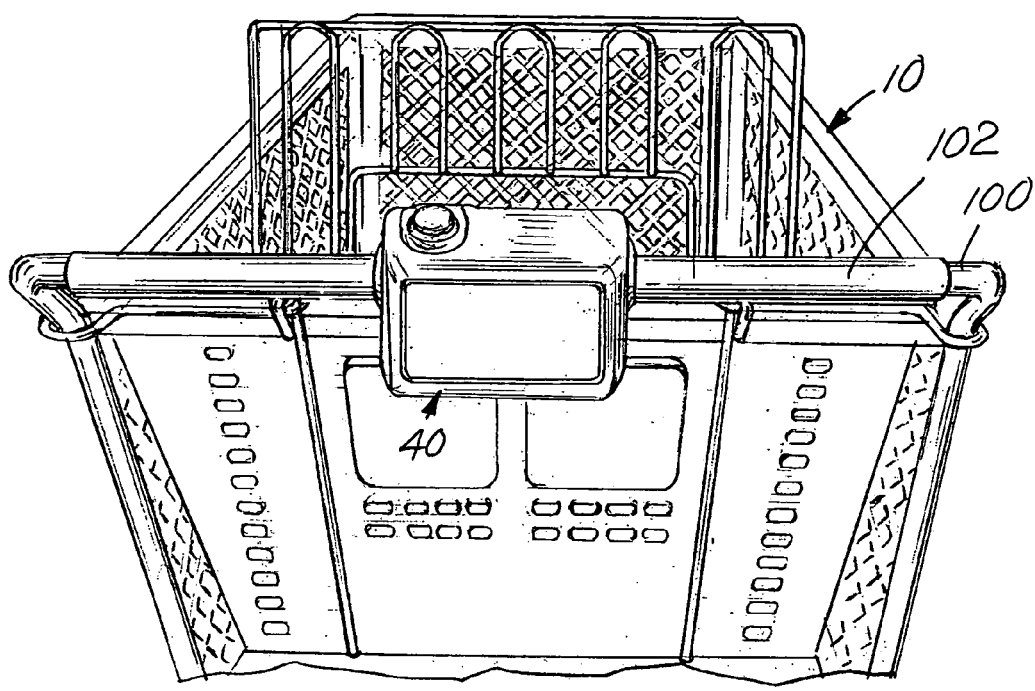
FIG. 15 is an isometric front side view of the apparatus of the invention as attached to a shopping cart handle.
Figure 16:
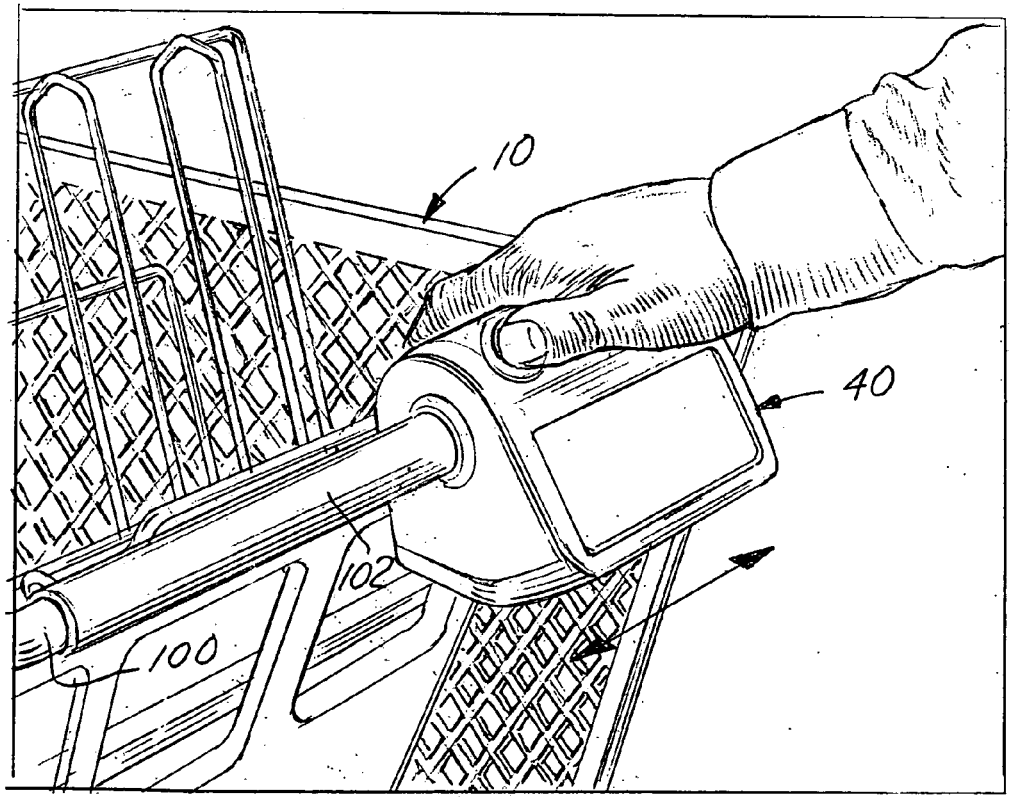
FIG. 16 is an isometric view illustrating the manner of operation of the apparatus of FIGS. 9-15.

The bar or rail is typically fixed; however, in certain circumstances it may be moveable to and fro with respect to an applicator, for example, as a telescoping vertical post on a push car. As another alternative, the handle or rail may be endless and may be moved along a pathway that includes the applicator. For example, the hand rail of an escalator may including a fixed reservoir positioned somewhere along its length so that applicator brushes and/or scrubbers will coat or engage the rail as it moves along its endless track. The applicator and/or reservoir may be a single assembly such as depicted in FIG. 14 or a multipart assembly such as in FIG. 22. The sanitizing agent is typically in the form of a fluid, but it may be in a powder form or a combination applied by mixing during or before application to a bar or rail. Certain light sources such as UV light may provide the sanitizing medium. A layer of applied film may comprise the sanitizing medium. Thus, the item being sanitized or cleaned or treated may be termed a bar, but should include thereby any item such as a rail subject to manual gripping.

Figure 24:
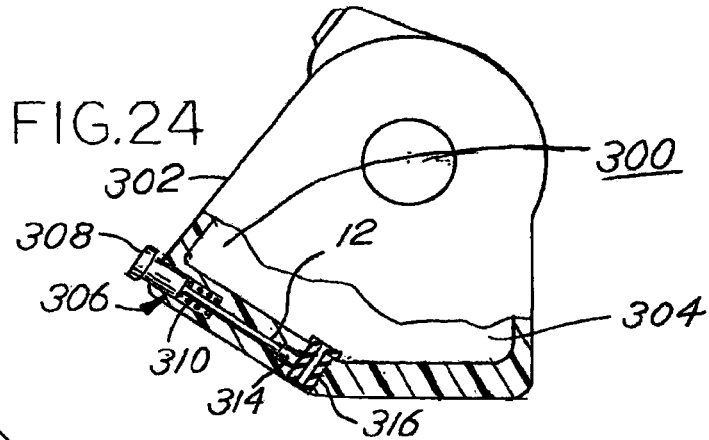
FIG. 24 is a cut away side elevation partial cross sectional view illustrating an optional feature for embodiments of the invention of a sanitizing fluid dispenser for dispensing aliquots of sanitizing fluid to clean or sanitize the hands of an individual using the sanitary device.
Figure 25:
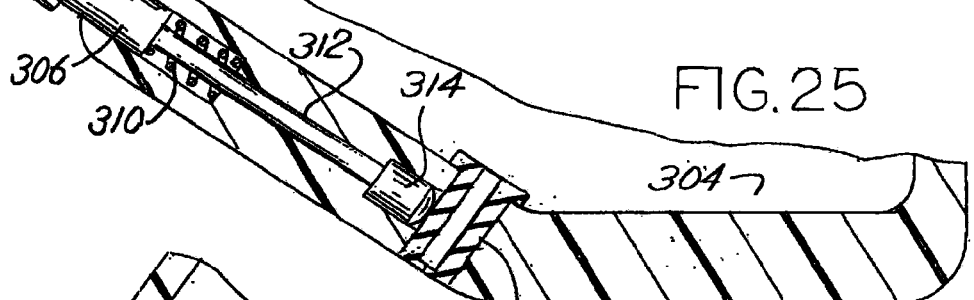
FIG. 25 is a partial side cross sectional view of the mechanism depicted in FIG. 24 for dispensing an aliquot.
Figure 27A:
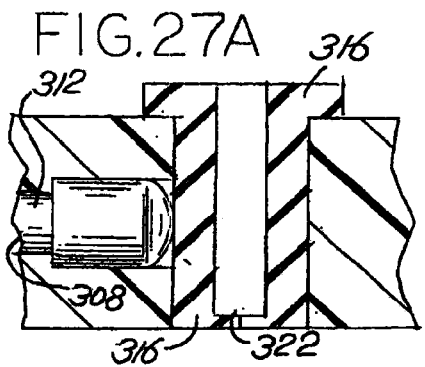
FIG. 27A is a further partial cross sectional view of the dispenser mechanism depicted in FIG. 27A upon actuation thereof as depicted in FIG. 26.

As a further feature of the invention, a supplementary or auxiliary dispensing mechanism may be associated with the reservoir for the sanitizing fluid to dispense sanitizing fluid onto the hands of a patron using the sanitizing device associated with a shopping cart or the like. FIGS. 24 27A depict a first embodiment of this additional feature. FIGS. 28-30 illustrate an alternative design for the dispensing mechanism.

Figure 26:
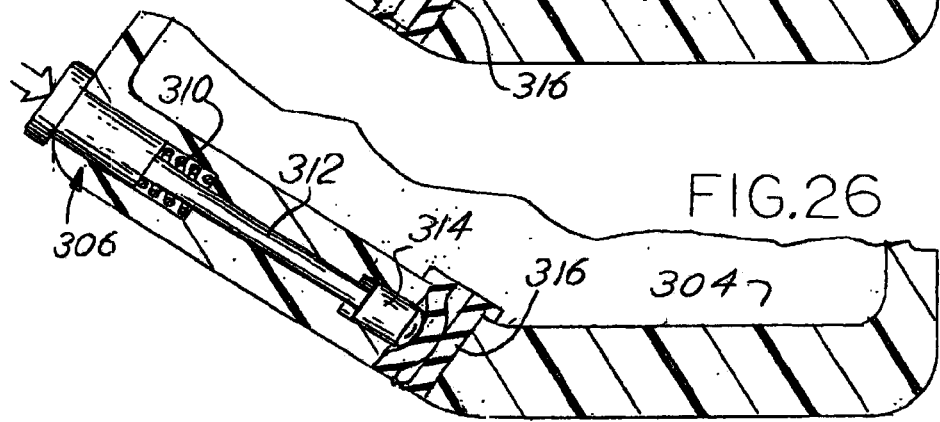
FIG. 26 is a further partial side cross sectional view of the mechanism of FIG. 25 illustrated in an actuated position.

Thus referring initially to FIG. 24, a reservoir 300 of sanitizing fluid includes a front face plate 302 generally oriented to face a user of the device on a shopping cart. The reservoir 300 includes sanitizing fluid as previously described. An auxiliary valve mechanism, generally shown at 306, includes a plunger 308 which is spring biased by a spring 310 outwardly within a sliding channel 312. The plunger 308 includes a blunt or plug end 314 aligned to engage a discharge tube 316 leading from the reservoir 300. Depression of the plunger 308 as depicted in FIG. 26 will effect dispensing of an aliquot of sanitizing fluid through the tubular passage 316. Typically, the sanitizing fluid will not flow through the tubular passage except upon actuation of the plunger 308. That is, surface tension associated with the fluid will preclude fluid from escaping through the tubular passage 316. Alternatively, the plunger 308 may actuate a one way valve through the passage 316.

Figure 27:
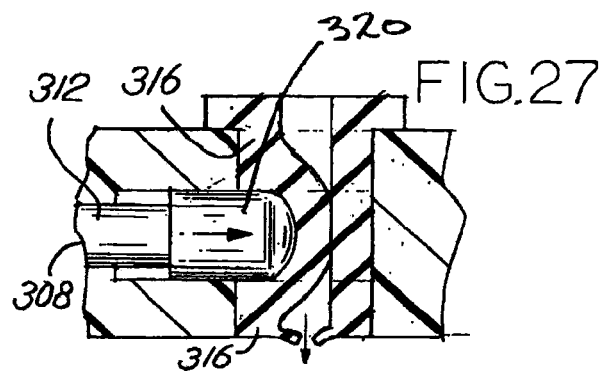
FIG. 27 is an enlarged view of the valve mechanism associated with the dispenser of FIGS. 25 and 26.

FIGS. 27 and 27A illustrate a manner in which an embodiment of the invention may be operable. There it is shown that the end or plug driving end 320 of the plunger 308 is positioned to engage the tubular passage 316 and upon flexing of the passage 316 as shown in FIG. 27A the fluid will be discharged through the reduced size or reduced diameter outlet orifice 322.

FIGS. 28-30 illustrate an alternative embodiment of the valve mechanism. Once again, a plunger device 324 is used. The plunger device is biased outwardly by a spring 326. The plunger is keyed or non-rotatably located to the passage 328 and the distal end 330 of the plunger includes a throughbore 332 which may be aligned with a passage 334 in the tubular member 336 leading from reservoir 338. Depressing the plunger 324 will enable fluid, such as sanitizing washing fluid, to flow from the reservoir 338 by gravity flow through the passage 334.

With the embodiments described with respect to FIGS. 24-30, therefore, an additional sanitizing aspect of the embodiments is provided. Specifically, the embodiments may include a supplemental discharge mechanism which enables the user of the sanitizing device to sanitize their hands, by way of example, or by way of example to place sanitizing fluid on a tissue and effectively wash their hands using the sanitizing fluid.

Consequently, various alternative constructions are disclosed including constructions wherein a reservoir is maintained at one side or the other of a handle bar and an applicator is movable along the length of the handle bar as in the embodiment of FIG. 18, for example. Another alternative is the utilization of a supplemental handle bar, for example, as described with reference to FIG. 22. The use of the supplemental handle bar will be particularly useful in circumstances where the main handle bar is encumbered by attachment to various reinforcing members, as is the case with many shopping carts.

The shopping cart handle sanitizing devices described herein provide a user-friendly, cost-effective and environmentally friendly method for sanitizing shopping cart handles, thereby protecting the public from the potential health hazards associated with exposure to unsanitary shopping cart handles. While the above description contains many specificities, these should not be construed as limitations on the scope of the invention, but rather as an exemplification of alternative embodiments. Many other variations are possible. For example, the main housing 16 may be attached directly to a standard shopping cart handle without the removal of said handle and exposure of the shopping cart handle frame 12, thereby eliminating the need for the replacement cover and rail mechanism 18. This could be accomplished by means of a fastener on the bottom of the main housing 16 which would provide sufficient tension to maintain an intended position (orientation) of the main housing 16 while still allowing the main housing 16 to be manually moved along the length of the shopping cart handle. Other aspects that can be modified are the dimension of each part of the devices, including but not limited to the dimension of the replacement cover and rail mechanism 18 so as to allow the device to be adapted to different types of shopping carts which may have handles of varying shapes and sizes. Also the material from which the main housing 16 and other parts are manufactured may vary based on manufacturing efficiencies and performance characteristics. For example, the main housing 16 and/or the replacement cover and rail mechanism 18 may be manufactured using anti-microbial plastic so as to further reduce the presence of pathogens on these parts.

Furthermore, although the above described embodiments utilize a cleaning fluid, such as an anti-bacterial or germicidal solution, to clean a handle bar of a shopping cart, it should be noted that other sanitizing means may be utilized instead. For example, a housing or applicator of a sanitizing device may incorporate a light-emitting section to irradiate the cart handle with UV light in order to sterilize it. A transparent material filter may be used to distribute the light.

Alternative embodiments incorporate at least one additional dispensing mechanism which may be actuated to dispense sanitizing fluid or material directly into the hands of a user or customer, thus effectively providing a sanitizing wash of the hands of the user or customer. The additional dispensing mechanism may be activated independently from the handle dispensing mechanism or in conjunction therewith.

The housing of the sanitizing device may include separate reservoirs or removable canisters which contain sanitizing material especially for the handle or the hands, as the case may be. For example, the material dispensed upon the hands may include a cosmetic cream or scent which is associated with a marketing promotion for a particular product or brand. Additionally, the housing for the sanitizing device may include panels designed for advertising messages or other customer information. The housing may further include a coupon holder or dispenser as part of, or in addition to, an advertising panel.

Accordingly, the scope of the invention should be determined not by the embodiment(s) illustrated, but by the appended claims and their legal equivalents.

What is claimed is:

1. A handle bar sanitizing device for a handle bar having an elongate axis, comprising:
    an elongate handle bar cover that substantially encircles and covers said handle bar;
    a hollow housing permanently slideably mounted on said elongate handle bar cover, said hollow housing fitting at least partially around said elongate handle bar cover;
    an applicator mounted within a hollow interior of said hollow housing;
    said hollow interior of said housing forming a reservoir adapted to store sanitizing material;
    a material transfer mechanism for transferring said sanitizing material from the reservoir to the applicator;
    said material transfer mechanism including a dispensing and spreading tube having an extent substantially equal to that of said hollow housing;
    an annular dispensing ring positioned within said dispensing and spreading tube;
    said annular dispensing ring formed of a wicking material;
    an opening formed in said dispensing and spreading tube so that said wicking material is in fluid communication with said sanitizing material in said reservoir and draws said sanitizing material in said hollow interior of said hollow housing through said opening and into said wicking material;
    said annular dispensing ring disposed in encircling relation to said elongate handle bar cover;
    whereby sanitizing material is applied along the length of said elongate handle bar cover by said annular dispensing ring when an operator slides said hollow housing along said elongate handle bar cover.

2. The device of claim 1, further comprising:
    said sanitizing fluid forming a layer of film when applied to said handle bar.

3. An apparatus for application of material onto a generally elongate handle bar cover of a shopping cart, comprising:
    a hollow housing configured to slidably move on said elongate handle bar cover;
    said hollow housing having a hollow interior that forms a reservoir adapted to contain and dispense a sanitizing fluid;
    at least one application element mounted within the hollow interior of the housing in contacting and encircling relation to said elongate handle bar cover;
    said reservoir being in valved fluid communication with the application element;
    a dispensing and spreading tube disposed within said hollow interior and having an extent substantially equal to that of said hollow housing;
    said application element being an annular dispensing ring positioned within a lumen of said dispensing and spreading tube;
    said annular dispensing ring being formed of a wicking material;
    a pump disposed within the hollow interior of the housing for pumping material from the reservoir to the annular dispensing ring;
    said pump having an actuator disposed external to said hollow housing, said actuator adapted for manual activation;
    an opening formed in said dispensing and spreading tube so that said wicking material is in fluid communication with said sanitizing material in said reservoir and draws said sanitizing fluid in said hollow interior of said hollow housing through said opening and into said wicking material only when said pump actuator is activated;
    whereby sanitizing material is applied along the length of said elongate handle bar cover by said annular dispensing ring when an operator activates said pump and slides said hollow housing along said elongate handle bar cover.

4. The apparatus of claim 3 further comprising:
    said annular dispensing ring being positioned about mid-length of said dispensing and spreading tube;
    a pair of spreading rings mounted in said lumen of said dispensing and spreading tube, there being one spreading ring at each end thereof.

5. The apparatus of claim 3 wherein the housing includes a display panel formed on the outside of the housing.

6. The apparatus of claim 3 further comprising:
    a key connection to prevent rotation of the housing relative to the handle bar cover.

7. The apparatus of claim 3 further comprising:
    orientation means for preventing rotation of said housing relative to said handle bar cover.

8. The apparatus of claim 7, further comprising:
    said handle bar cover having a non-circular transverse cross-section; and
    said housing having an opening complementally formed with said non-circular transverse cross-section.

9. A handle bar sanitizing device for a handle bar having an elongate axis, comprising:
    a hollow housing slideably mounted on said handle bar, said hollow housing fitting at least partially around said handle bar;
    a hollow interior of said housing forming a reservoir adapted to store a sanitizing fluid;
    a dispensing and spreading tube having an extent substantially equal to that of said hollow housing;
    an annular dispensing ring positioned within a lumen of said dispensing and spreading tube;
    said annular dispensing ring formed of a wicking material;
    an opening formed in said dispensing and spreading tube so that said wicking material is in permanent fluid communication with said sanitizing fluid in said reservoir and draws said sanitizing fluid through said opening into said wicking material;
    said annular dispensing ring disposed in encircling relation to said handle bar;
    whereby sanitizing fluid is applied along the length of said handle bar by said annular dispensing ring when an operator slides said hollow housing along said handle bar.

10. A handle bar sanitizing device for a handle bar having an elongate axis, comprising:
    a hollow housing permanently slideably mounted on said handle bar, said hollow housing fitting at least partially around said handle bar;

a hollow interior of said housing forming a reservoir adapted to store sanitizing fluid;

a dispensing and spreading tube disposed in said hollow interior of said housing and having an extent substantially equal to that of said hollow housing;

an opening formed in said dispensing and spreading tube;

an annular dispensing ring positioned within a lumen of said dispensing and spreading tube in registration with said opening;

said annular dispensing ring formed of a wicking material;

said annular dispensing ring disposed in encircling relation to said handle bar;

a pump disposed within said hollow interior of said housing;

said pump being in valved fluid communication with said opening;

said pump including an actuator disposed externally of said hollow housing;

whereby sanitizing fluid is applied along the length of said handle bar by said annular dispensing ring when an operator activates said pump and slides said hollow housing along said handle bar.

11. A handle bar sanitizing device for a handle bar having an elongate axis, comprising:

a hollow housing permanently mounted on said handle bar in a fixed position at a preselected end of said handle, said hollow housing fitting at least partially around said handle bar;

a hollow interior of said hollow housing adapted to store and dispense sanitizing fluid;

an auxiliary housing slideably mounted to said handle bar;

said auxiliary housing including an annular dispensing ring formed of a wicking material;

said annular dispensing ring disposed in encircling relation to said handle bar;

said auxiliary housing adapted to dock with said fixed position housing;

a pump disposed within said hollow interior of said housing;

said pump having a manually activated actuator disposed externally to said housing;

said annular dispensing ring of auxiliary housing being in fluid communication with said sanitizing fluid when said auxiliary housing is in docked relation to said housing and when said pump is activated;

whereby sanitizing fluid is applied to said annular dispensing ring and hence to said handle bar when an operator places said auxiliary housing in said docked relation to said housing, activates said pump, and slides said auxiliary housing along an extent of said handle bar.

12. A handle bar sanitizing device for a handle bar having an elongate axis, comprising:

a hollow housing permanently slideably mounted on said handle bar, said hollow housing including an upper shell and a lower shell that engage one another about their respective peripheral edges about said handle bar;

a flexible reservoir adapted to store sanitizing fluid being disposed in substantially encircling relation to said handle bar and being positioned within a hollow interior of said hollow housing;

at least one button formed integrally with said flexible reservoir, said upper and lower shells having openings formed therein to accommodate said at least one button so that said at least one button is adapted to be pressed by an operator;

an application member substantially encircled by said flexible reservoir;

said flexible reservoir being in valved fluid communication with said application member and being adapted to apply sanitizing fluid to said application member when said at least one button is pushed;

said application member disposed in substantially encircling relation to said handle bar; whereby sanitizing fluid is applied along the length of said handle bar by said application member when an operator presses said at least one button and slides said hollow housing along said handle bar.

13. An auxiliary handle bar sanitizing device, comprising:

an auxiliary handle bar adapted to be attached to a primary handle bar;

said auxiliary handle bar having a major extent thereof disposed in parallel relation to said primary handle bar;

at least one end of said auxiliary handle bar including a fixed position reservoir adapted to hold a sanitizing fluid;

said fixed position reservoir including a flexible sealing means at an inboard end thereof;

an auxiliary housing slideably mounted to said auxiliary handle bar;

said auxiliary housing including an annular dispensing ring formed of a wicking material;

said annular dispensing ring disposed in encircling relation to said auxiliary handle bar;

said auxiliary housing adapted to dock with said flexible sealing means;

said annular dispensing ring of said auxiliary housing being in fluid communication with said sanitizing fluid when said auxiliary housing is pressed against said flexible sealing means;

whereby sanitizing fluid is applied to said annular dispensing ring and hence to said handle bar when an operator places said auxiliary housing in said docked relation to said flexible sealing means, slides said auxiliary housing against said flexible sealing means, and thereafter slides said auxiliary housing along an extent of said auxiliary handle bar.

* * * * *